US006898795B2

(12) United States Patent
Inoue

(10) Patent No.: US 6,898,795 B2
(45) Date of Patent: May 24, 2005

(54) DISK DRIVE UNIT

(75) Inventor: Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/433,132

(22) PCT Filed: Oct. 1, 2002

(86) PCT No.: PCT/JP02/10213

§ 371 (c)(1),
(2), (4) Date: May 29, 2003

(87) PCT Pub. No.: WO03/032309

PCT Pub. Date: Apr. 17, 2003

(65) Prior Publication Data

US 2004/0062175 A1 Apr. 1, 2004

(30) Foreign Application Priority Data

Oct. 1, 2001 (JP) ........................................ 2001-305594

(51) Int. Cl.$^7$ .......................... G11B 23/03; G11B 17/04
(52) U.S. Cl. ...................... 720/644; 720/734; 720/742; 720/643
(58) Field of Search ............................... 720/742, 738, 720/734, 643, 644; 360/133

(56) References Cited

U.S. PATENT DOCUMENTS

| 5,260,931 A | * | 11/1993 | Sasaki et al. ................ 720/742 |
| 5,570,342 A | * | 10/1996 | Kosaka ........................ 720/742 |
| 6,590,858 B2 | * | 7/2003 | Inoue .......................... 720/742 |
| 6,700,741 B2 | * | 3/2004 | Inoue et al. ................. 360/133 |

FOREIGN PATENT DOCUMENTS

| JP | 58-111148 | | 7/1983 | |
| JP | 08180634 A | * | 7/1996 | ........... G11B/23/03 |
| JP | 08263959 A | * | 10/1996 | ........... G11B/23/03 |
| JP | 2000003575 A | * | 1/2000 | ........... G11B/23/03 |

* cited by examiner

Primary Examiner—William J. Klimowicz
(74) Attorney, Agent, or Firm—Frommer Lawrence & Haug LLP; William S. Frommer

(57) ABSTRACT

A disk drive unit is provided that is capable of reasonably, smoothly opening/closing a shutter by rotation of an inner rotor. The disk drive unit is configured such that an inner rotor (4) is reasonably, smoothly rotated by sequentially engaging a shutter opening/closing starting projection (72), a rack portion (74), and a shutter opening/closing ending projection (76) of a rack member (71) with a shutter opening/closing starting recess (26), a partial gear (27), and a shutter opening/closing ending recess (28) in the outer periphery of the inner rotor (4).

3 Claims, 44 Drawing Sheets

DISK DRIVE UNIT

TECHNICAL FIELD

The present invention relates to the technical field of a disk drive unit in which a disk cartridge of a type of housing or exchangeably housing a disk-like recording medium such as a DVR, DVD, or DVD-ROM is to be loaded, and particularly to the technical field of opening/closing shutters of the disk cartridge.

BACKGROUND ART

Disk cartridges have been configured, for example, as shown in FIG. 44. Referring to this figure, there is shown a related art disk cartridge 101 in which a disk D such as a DVR, DVD, or DVD-ROM is rotatably housed between upper and lower shells 102 and 103. In this disk cartridge, a pair of upper and lower pickup insertion ports 104, which are formed in the upper and lower shells 102 and 103 respectively, are opened/closed from the upper side of the upper and lower shells 102 and 103 by a shutter 105 having a nearly U-shape in cross-section, and the shutter 105 is slid along one side surface 101a of the disk cartridge 101.

The related art disk cartridge 101, however, has a problem that since the shutter 105 is mounted to the outer side of the disk cartridge 1, the shutter 105 is simply openable by sliding the shutter 105, to allow damage of the disk D in the disk cartridge 101 or adhesion of dust or the like on the disk D, thereby causing drop out of data at the time of recording and/or reproduction of the data.

To solve the above problem, the present invention has been made, and an object of the present invention is to provide a disk drive unit using a disk cartridge which houses a disk-like recording medium and which is configured such that a pickup insertion port is opened/closed, from inside, with a shutter by rotation of an inner rotor, characterized by reasonably, smoothly opening/closing the shutter by rotation of the inner rotor.

DISCLOSURE OF INVENTION

To achieve the above object, according to the present invention, there is provided a disk drive unit for recording and/or reproducing information on and/or from a disk-like recording medium rotatably housed in a disk cartridge including an inner rotor rotatably housed therein and a shutter for opening/closing, from inside, a pickup insertion port by rotation of the inner rotor. The disk drive unit includes a rack member having a shutter opening/closing starting projection, a rack portion, and a shutter opening/closing ending projection, which are to be sequentially engaged with a shutter opening/closing starting recess, a partial gear, and a shutter opening/closing ending recess or projection formed in or on the outer periphery of the inner rotor; and driving means for rotating the inner rotor from a shutter opening/closing starting position to a shutter opening/closing ending position by sliding the rack member relative to the disk cartridge. The disk drive unit is characterized in that the drive means moves at least one of the rack member and the disk cartridge in such a manner that the shutter opening/closing starting recess and the shutter opening/closing ending recess or projection of the inner rotor are engaged with and released from the shutter opening/closing starting projection and the shutter opening/closing ending projection of the rack member.

The disk drive unit of the present invention having the above-described configuration has the following advantage.

The disk cartridge in which the disk-like recording medium is housed is configured such that the pickup insertion port is open/closed, from inside, with the shutters by rotation of the inner rotor, to thereby prevent the shutters from being simply opened from outside. In this disk cartridge, the inner rotor is rotated by sliding the rack member relative to the disk cartridge, to open/close the shutters. At this time, the inner rotor can be continuously rotated from the shutter opening/closing starting position to the shutter opening/closing ending position by sequentially engaging the shutter opening/closing starting projection, the rack portion, and the shutter opening/closing ending projection of the rack member with the shutter opening/closing starting recess, the partial gear, and the shutter opening/closing ending recess in the outer periphery of the disk cartridge. To be more specific, at this time, the shutter opening/closing starting projection and the shutter opening/closing projection of the rack member can be reasonably, smoothly engaged with the shutter opening/closing starting recess and the shutter opening/closing ending recess, whereby the shutters can be reasonably, smoothly opened/closed by rotation of the inner rotor.

BEST MODE FOR CARRYING OUT THE INVENTION

Hereinafter, embodiments of a disk cartridge and a disk drive unit, to which the present invention is applied, will be described with reference to FIGS. 1 to 43.

Figure 41:
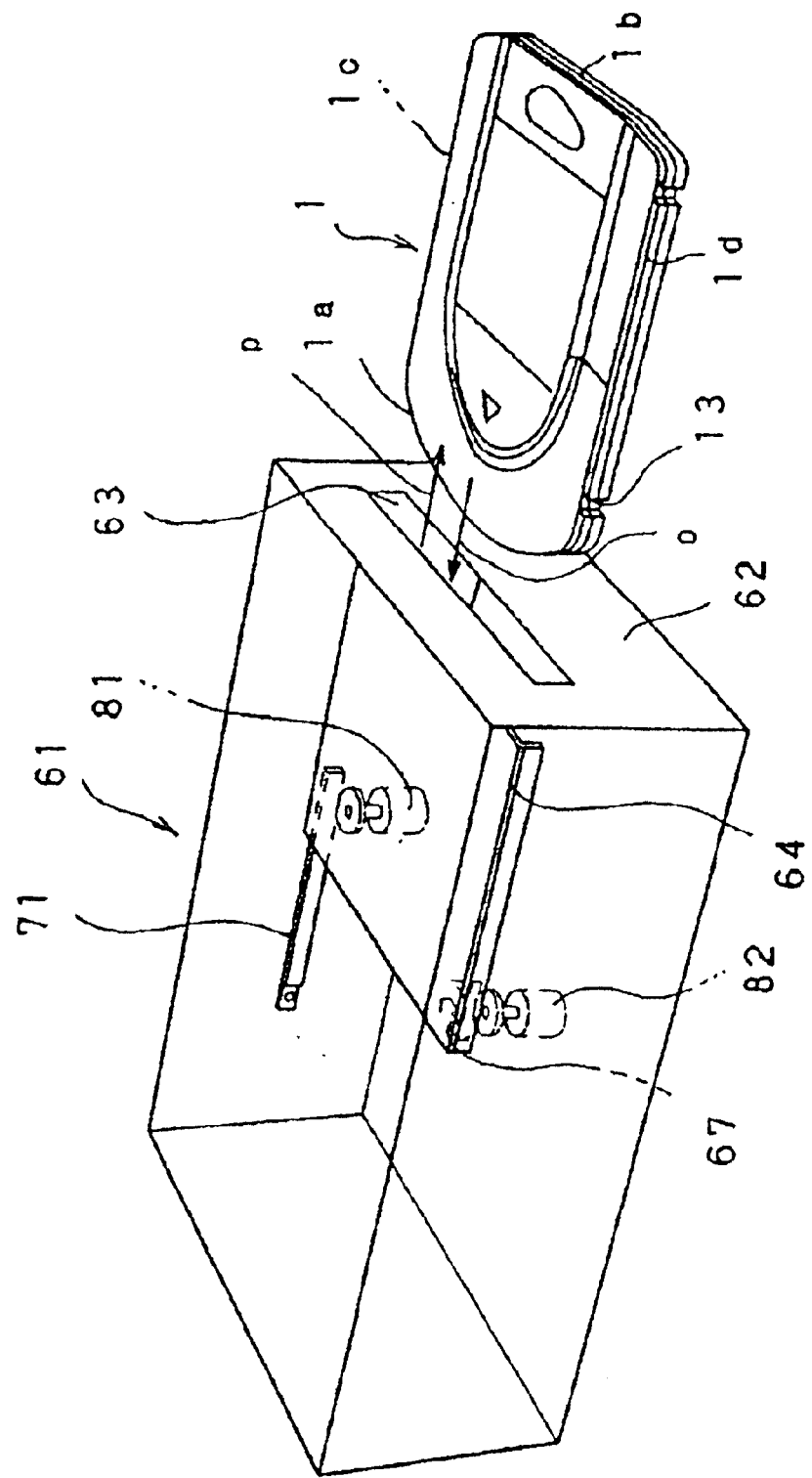
FIG. 41 is a perspective view showing a third example of a method of sliding the rack member relative to the disk cartridge for opening/closing the shutters of the disk cartridge.
Figure 42:
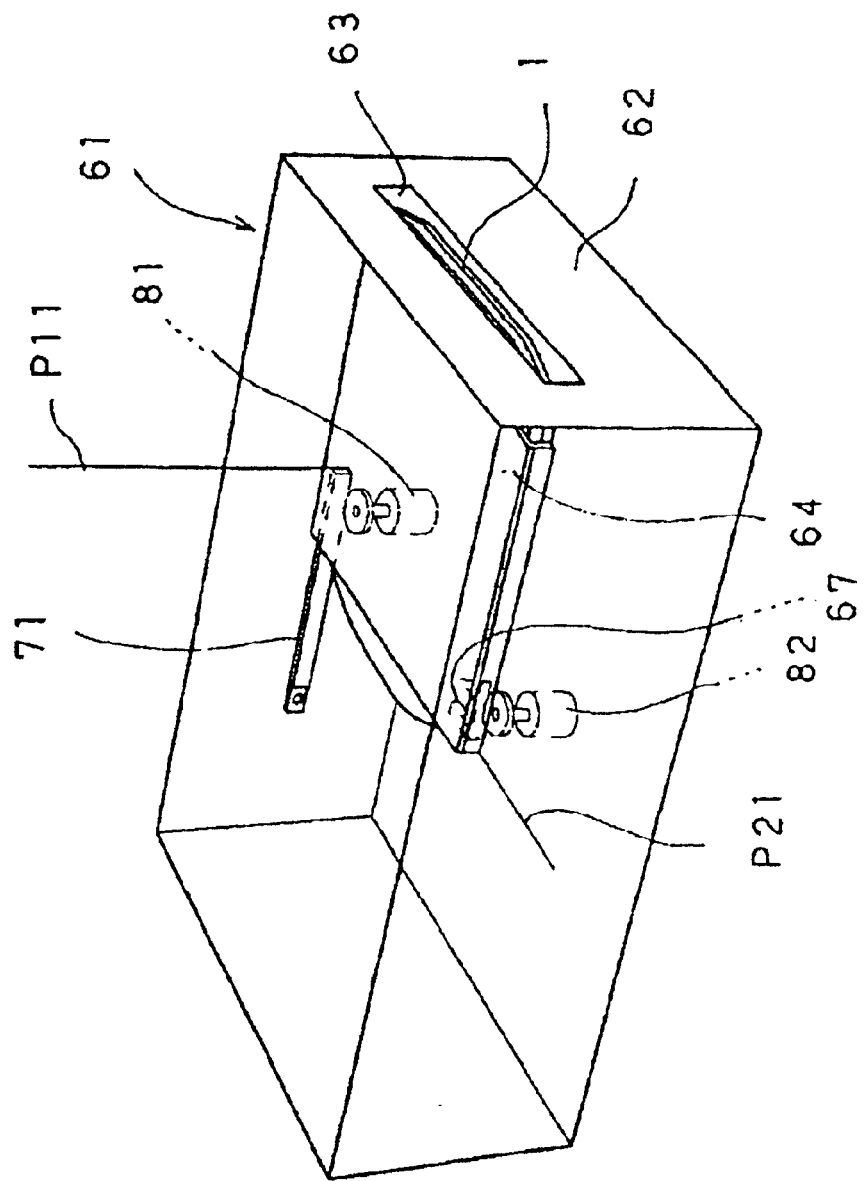
FIG. 42 is a perspective view, continuous to FIG. 41, showing the third example of the method of sliding the rack member relative to the disk cartridge.
Figure 43:
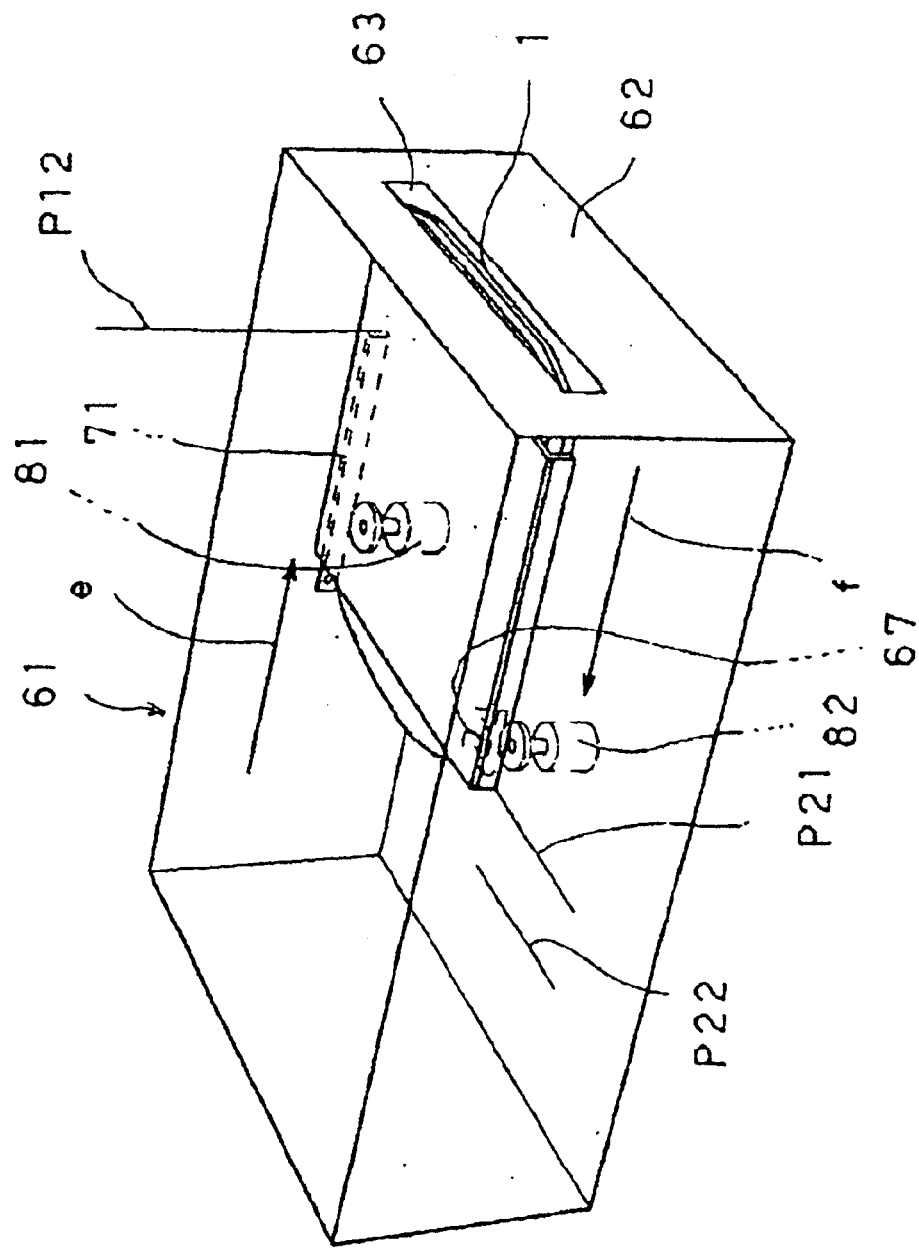
FIG. 43 is a perspective view, continuous to FIG. 42, showing the third example of the method of sliding the rack member relative to the disk cartridge.
Figure 44:
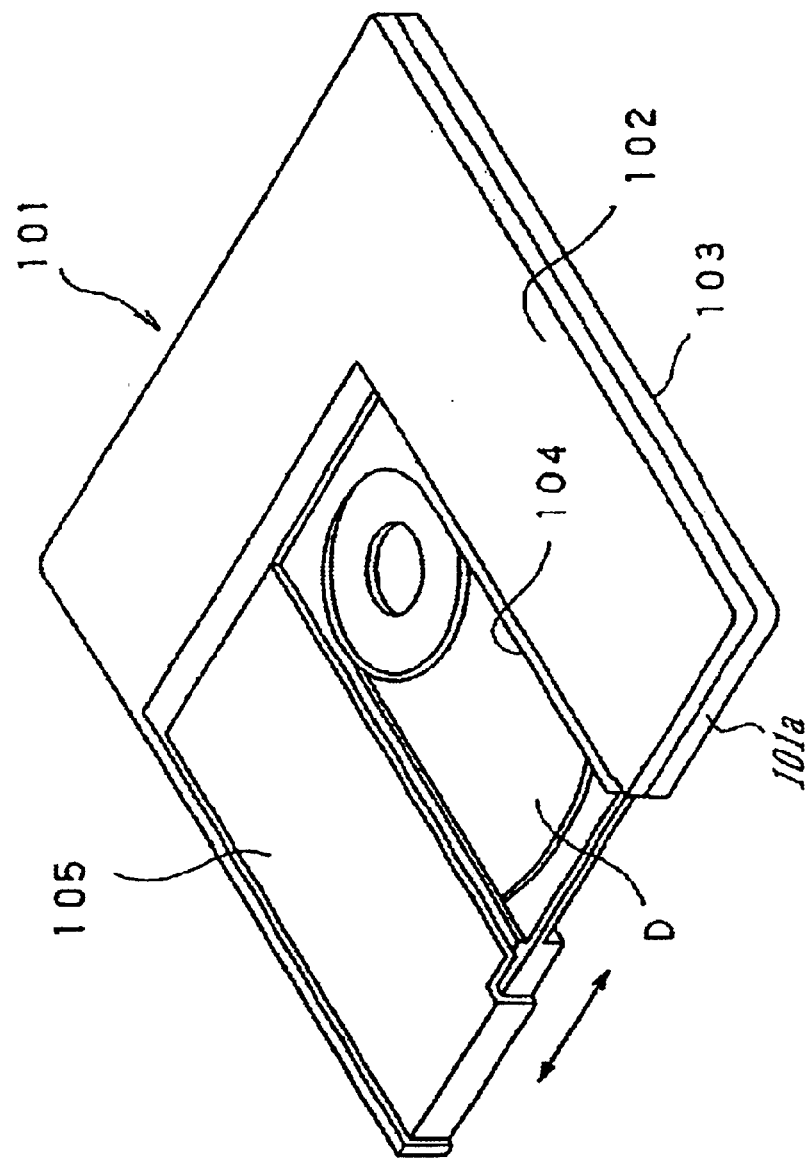
FIG. 44 is a perspective view of a related art disk cartridge.

It is to be noted that description will be made in the following order:
(1) Description of Operation for Rotating Inner Rotor between shutter Opening/Closing Starting Position and Shutter Opening/Closing Ending Position by Rack Member of Disk Drive Unit (FIGS. 1 to 9)
(2) Description of Relative Relationship between Shutter Opening/Closing Starting Recess, Partial Gear, and Shutter Opening/Closing Ending Recess Provided on Outer Peripheral Side of Inner Rotor and Shutter Opening/Closing Starting Projection, Rack Portion, and Shutter Opening/Closing Ending Projection Provided on Rack Member Side (FIGS. 11 and 12)
(3) Description of Reference Plane to Rack Member Defined by Side Plane of Disk Cartridge (FIGS. 13 to 16)
(4) Description of Supporting Structure of Rack Member for Supporting Shutter Opening/Closing Starting Projection and Shutter Opening/Closing Ending Projection (FIGS. 17 to 20)
(5) Description of Disk Cartridge Using Inner Rotor (FIGS. 21 to 24)
(6) Description of Shutter Opening/Closing Mechanism Opened/Closed by Rotation of Inner Rotor (FIGS. 25 to 32)
(7) Description of First Example of Method of Sliding Rack Member Relative to Disk Cartridge in Disk Drive Unit (FIGS. 34 to 36)
(8) Description of Second Example of Method of Sliding Rack Member Relative to Disk Cartridge in Disk Drive Unit (FIGS. 37 to 40)
(9) Description of Third Example of Method of Sliding Rack Member Relative to Disk Cartridge in Disk Drive Unit (FIGS. 41 to 43)

(1) Description of Operation for Rotating Inner Rotor between Shutter Opening/Closing Starting Position and Shutter Opening/Closing Ending Position by Rack Member of Disk Drive Unit Referring to FIGS. 1 to 9, there will be described an operation of rotating an inner rotor of a disk cartridge (to be described later) from a shutter opening/closing starting position shown in FIG. 1 to a shutter opening/closing ending position shown in FIG. 9 by a rack member of a disk drive unit (to be described later).

Figure 1:
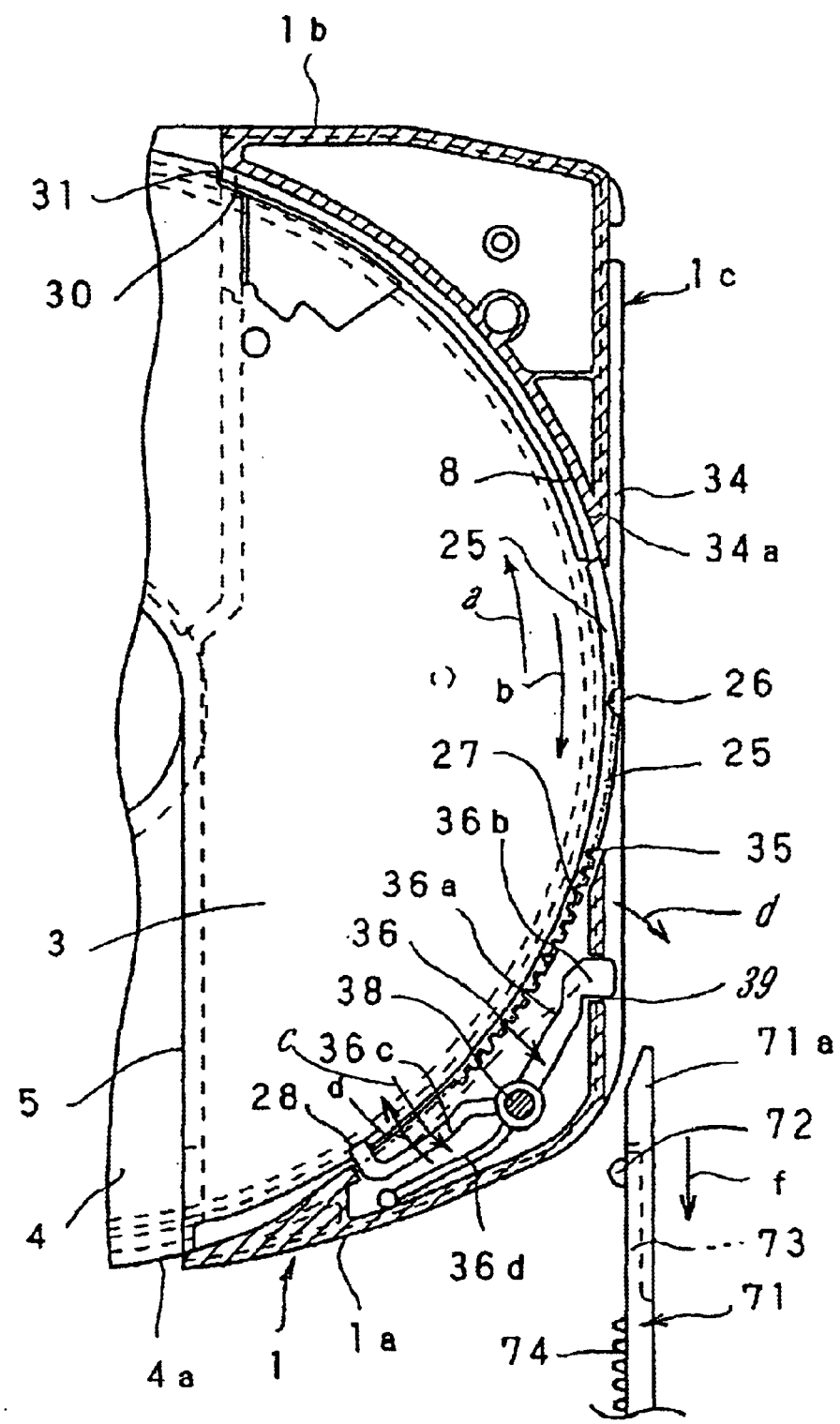
FIG. 1 is a bottom view, with parts partially cutaway, of an initial state for illustrating an operation of rotating an inner rotor by a rack member in an embodiment of a disk cartridge and a disk drive unit to which the present invention is applied.

In FIG. 1, the direction shown by an arrow "a" denotes the direction along which an inner rotor 4 is rotated for opening shutters, whereas the direction shown by an arrow "b" denotes the direction along which the inner rotor 4 is rotated for closing the shutters.

FIG. 1 shows an initial state that the inner rotor 4 remains as having been returned in the direction "b" to a shutter opening/closing starting position and locked by a rock member 36.

A shutter opening/closing starting projection 25 is integrally molded on an outer peripheral surface 4a of the inner rotor 4 in such a manner as to project therefrom in a circular-arc shape. A recessed groove 34 having a bottom portion 34a is formed in one side surface 1c of a disk cartridge 1. A rectangular window hole 35 is opened in the bottom portion 34a of the recessed groove 34 at a nearly central position thereof in the length direction. The shutter opening/closing starting projection 25 projects in a circular-arc shape in the recessed groove 34 through the window hole 35. As a result, the window hole 35 is closed with the shutter opening/closing starting projection 25. A shutter opening/closing starting recess 26, functioning as a rotation starting point of the inner rotor 4, is formed in the shutter opening/closing starting projection 25 at a nearly central position thereof in the circumferential direction. The shutter opening/closing starting recess 26 is located in the window hole 35 at a nearly central position thereof in the length direction.

A partial gear 27 or an outer peripheral gear is integrally molded in a circular-arc shape on the outer peripheral surface 4a of the inner rotor 4. The partial gear 27 is located at a position offset on the direction "b" side from the shutter opening/closing starting projection 25. The partial gear 27 is withdrawn from the window hole 35 to a position on the direction "b" side in the disk cartridge 1, to be thus hidden in the disk cartridge 1.

A shutter opening/closing ending recess 28 serving as a locking recess is formed on the outer peripheral surface 4a of the inner rotor 4 at a position offset on the direction "b" side from the partial gear 27 by a specific distance. The shutter opening/closing ending recess 28 is locked with the lock member 36. The lock member 36 made from a synthetic resin or the like is molded into a nearly Y-shape. A fulcrum pin 38 is provided inside a lower shell 3. Concretely, the fulcrum pin 38 is integrally molded on a portion, near the outer periphery of the inner rotor 4, of the lower shell 3. The lock member 36 is mounted to the fulcrum pin 38 in such a manner as to be rotatable in the directions "c" and "d" around the fulcrum pin 38. The lock member 36 has a lock releasing arm 36a. A leading end 36b of the lock releasing arm 36a projects in the direction "d" into the recessed groove 34 through a hole 39. The hole 39 is formed in the bottom portion 34a of the recessed groove 34 at a position offset to the front surface 1a side from the window hole 35. The lock member 36 also has a lock arm 36c, which is nearly forked oppositely from the lock releasing arm 36a. The lock arm 36c is engaged in the shutter opening/closing ending recess 28 of the inner rotor 4 by a weak spring force of a mold spring 36d, to lock the inner rotor 4.

Figure 22:
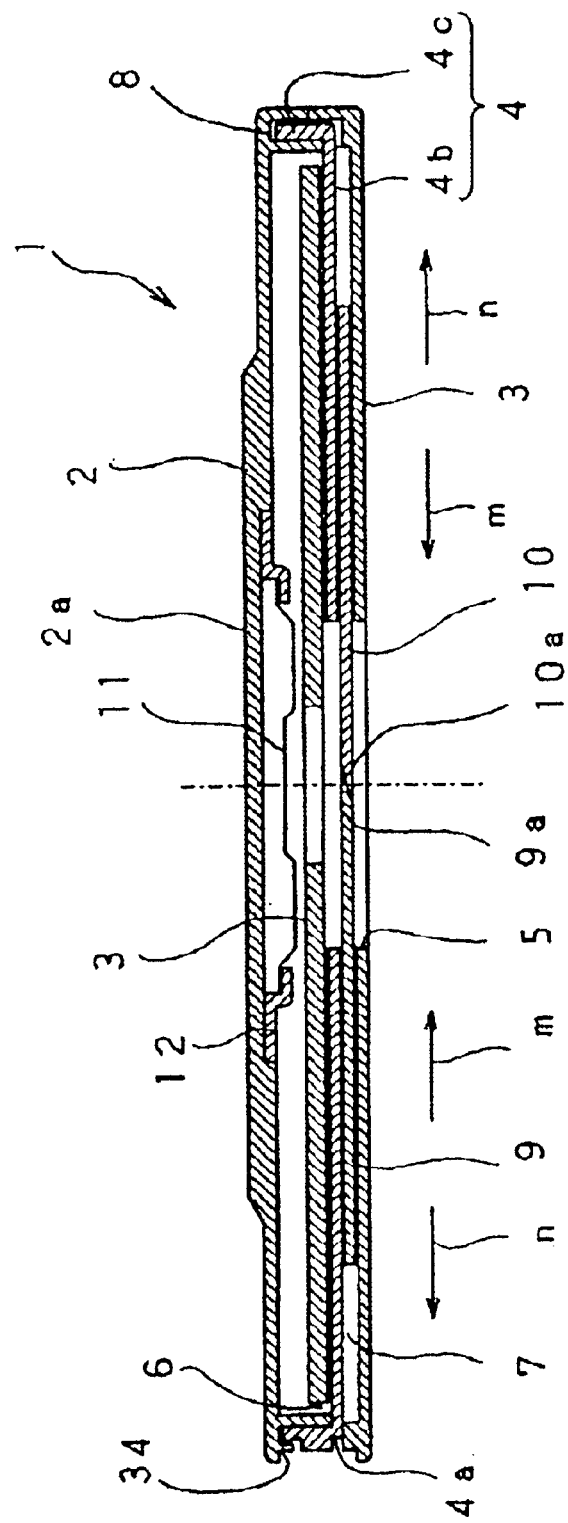
FIG. 22 is a sectional view taken on line B—B of FIG. 21 showing the disk cartridge.
Figure 23:
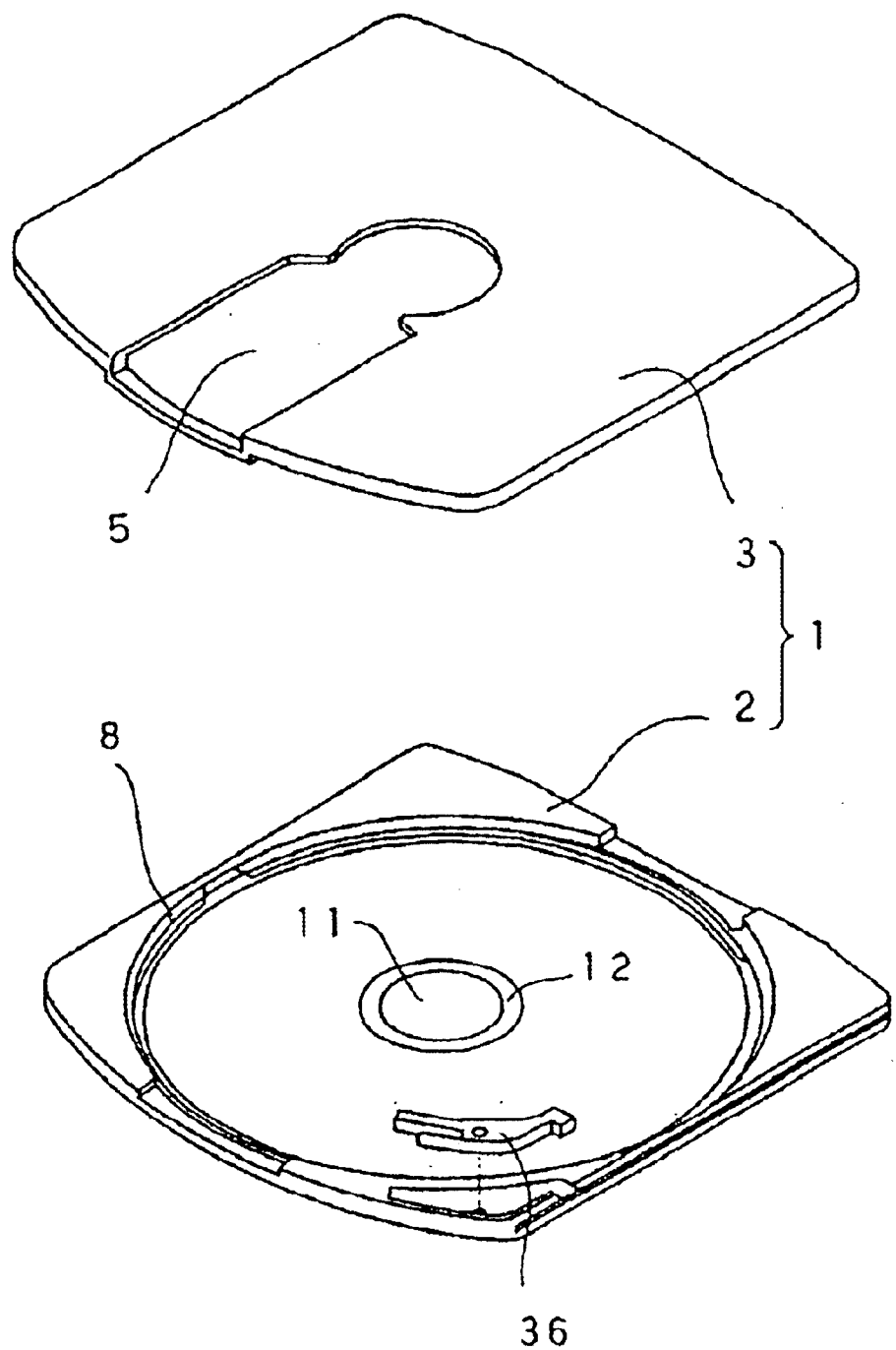
FIG. 23 is an exploded perspective bottom view of upper and lower shells of the disk cartridge.
Figure 24:
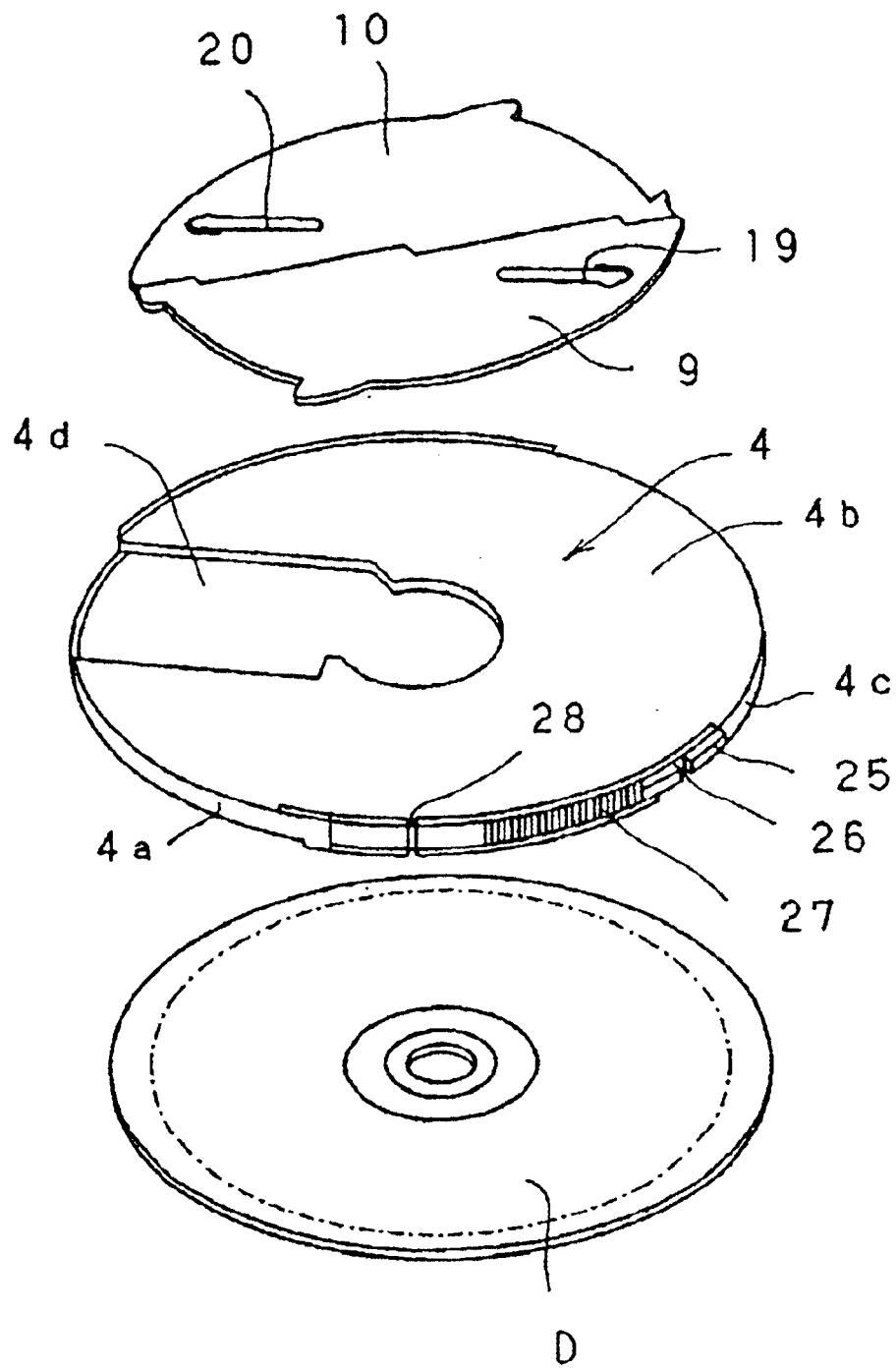
FIG. 24 is an exploded perspective bottom view of the inner rotor, shutters, and a disk of the disk cartridge.
Figure 26:
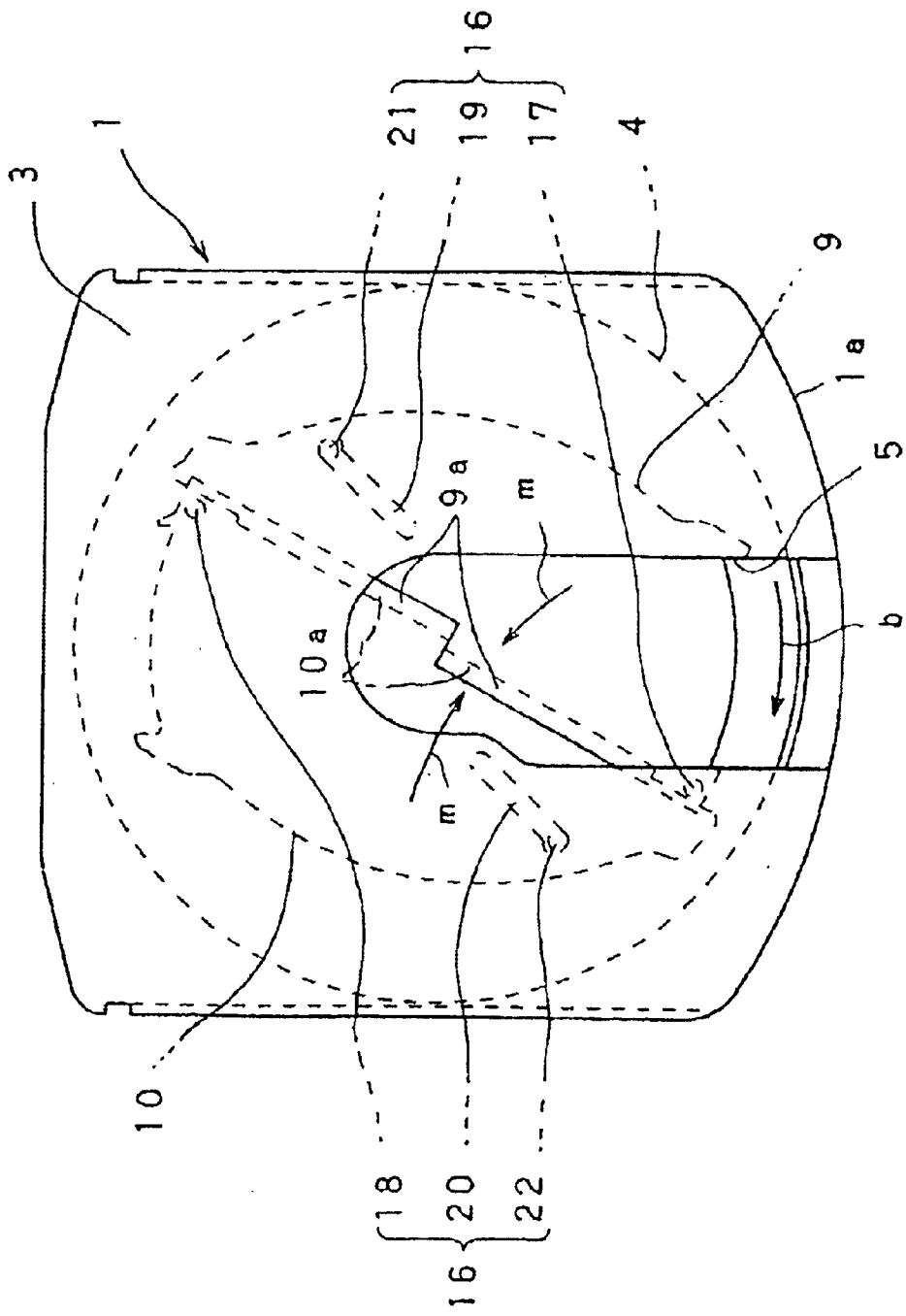
FIG. 26 is a bottom view showing a state that the shutters are closed, to close a pickup insertion hole of the disk cartridge.

Accordingly, in this initial state, as will be described with reference to FIGS. 22 and 26, a pickup insertion hole 5 of the disk cartridge 1 is closed from the inside with a pair of shutters 9 and 10, and the partial gear 27 formed on the outer periphery of the inner rotor 4 in order to open/close the shutters 9 and 10 is hidden in the disk cartridge 1. As a result, even if locking of the inner rotor 4 is released by depressing the lock releasing arm 36a of the lock member 36 in the direction "c" with a finger, the inner rotor 4 cannot be rotated by operating the partial gear 27 from external of the disk cartridge 1 with a finger. In other words, even if locking of the inner rotor 4 is released, the shutters 9 and 10 cannot be opened.

FIGS. 2 to 9 show states that a rack member 71 provided as an inner rotor rotating means in the disk drive unit (to be described later) is sequentially slid relative to the disk cartridge 1 in the direction "e" along one side surface 1c of the disk cartridge 1.

Figure 2:
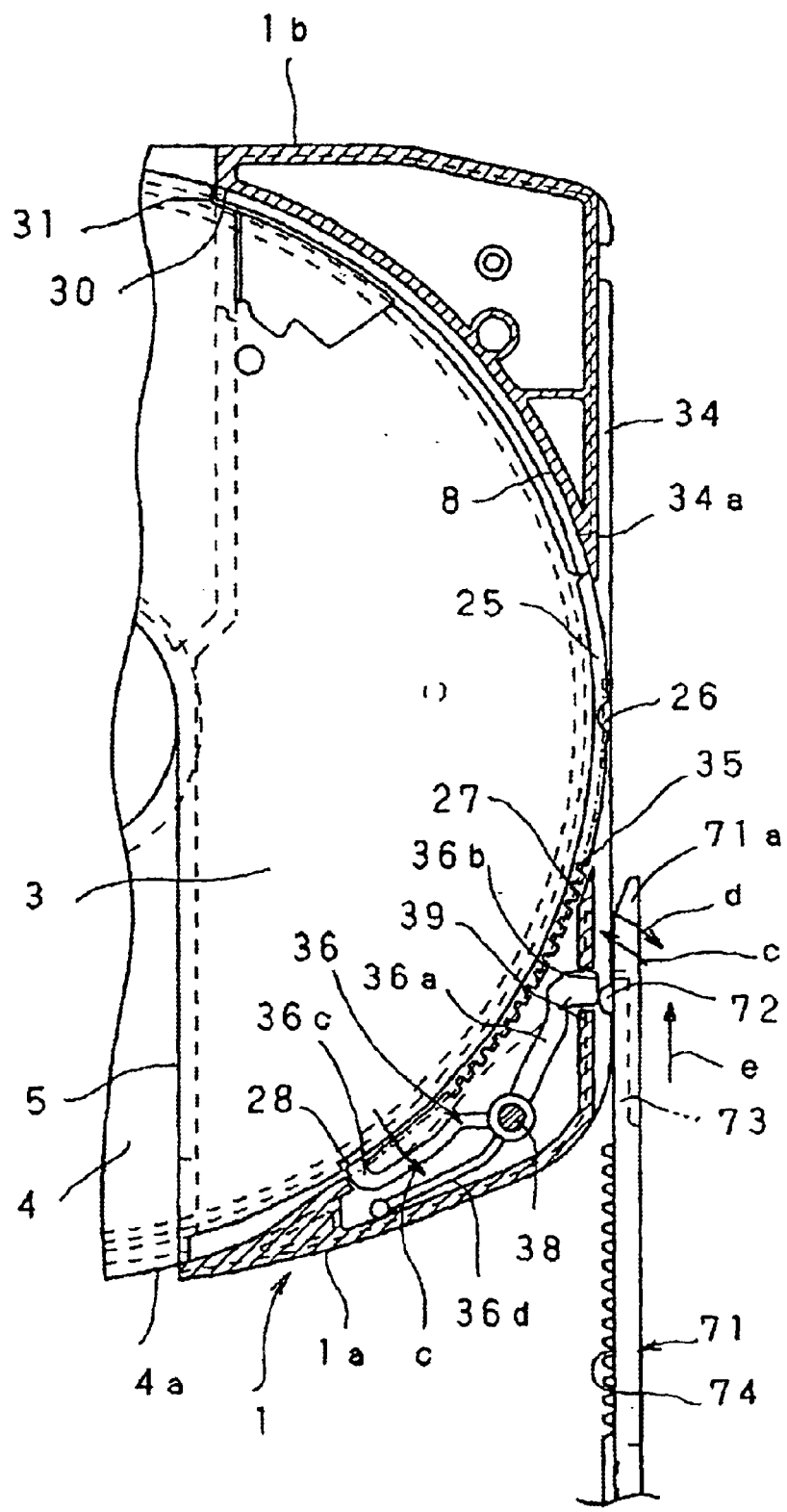
FIG. 2 is a bottom view, with parts partially cutaway, showing a state that the inner rotor is started to be rotated from the initial state shown in FIG. 1.

As shown in FIG. 2, when the rack member 71 is slid relative to the disk cartridge 1 in the direction "e" to a specific position, a shutter opening/closing starting projection 72 of the rack member 71, which projection is located on the leading end 71a side and which is adapted for starting the rotation of the inner rotor, pushes the leading end 36b of the lock releasing arm 36a of the lock member 36 in the direction "c". As a result, the lock arm 36c of the lock member 36 is rotated in the direction "c" against the spring force of the mold spring 36d, to be separated from the shutter opening/closing ending recess 28 of the inner rotor 4, whereby the locking of the inner rotor 4 is released.

When the rack member 71 is further slid in the direction "e", the shutter opening/closing starting projection 72 is separated from the leading end 36b of the lock releasing arm 36a of the lock member 36 in the direction "e". As a result, the leading end 36b of the lock releasing arm 36a of the lock member 36 again projects from the hole 39 into the recessed groove 34 in the direction "d" by the spring force of the mold spring 36d.

Figure 3:
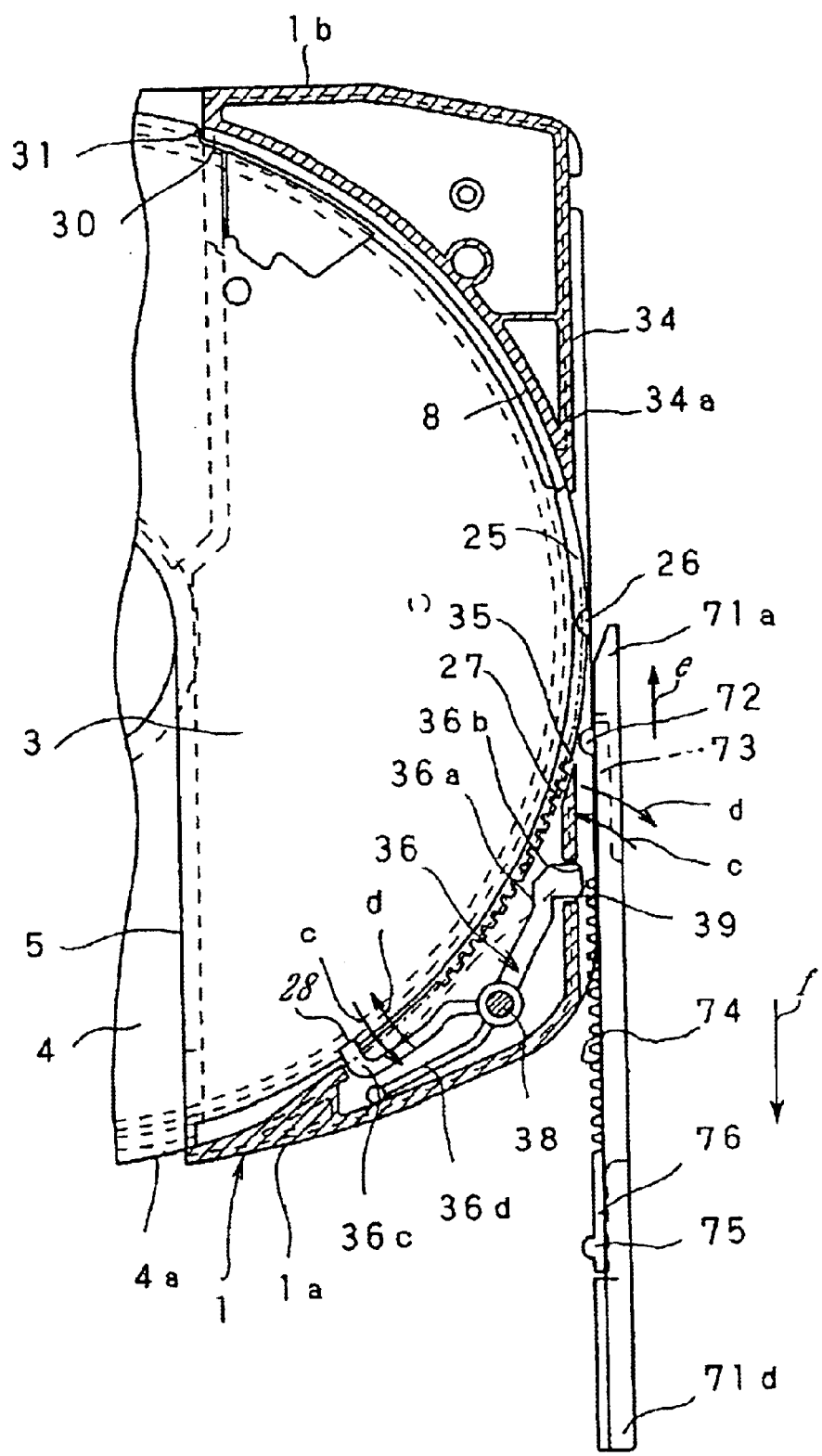
FIG. 3 is a bottom view, with parts partially cutaway, showing a rotational action of the inner rotor continuous to that shown in FIG. 2.

However, as shown in FIG. 3, almost as soon as the shutter opening/closing starting projection 72 of the rack member 71 comes in contact with the shutter opening/closing starting projection 25 on the outer periphery of the inner rotor 4 in the direction "e", the leading end side of a rack portion 74 serving as the lock releasing portion of the rack member 71 rides on the leading end 36b of the lock releasing arm 36a of the lock member 36, to depress again the lock releasing arm 36a in the direction "c".

Consequently, in the same way as that described above, the lock arm 36c of the lock member 36 is biased to be rotated in the direction "c", that is, in the lock releasing direction against the spring force of the mold spring 36d, and thereby the lock member 36 is turned into the lock releasing state. Since then, the lock member 36 is kept as being in the lock releasing state during rotation until the inner rotor 4 is rotated intermediately before a shutter opening/closing ending position.

Figure 4:
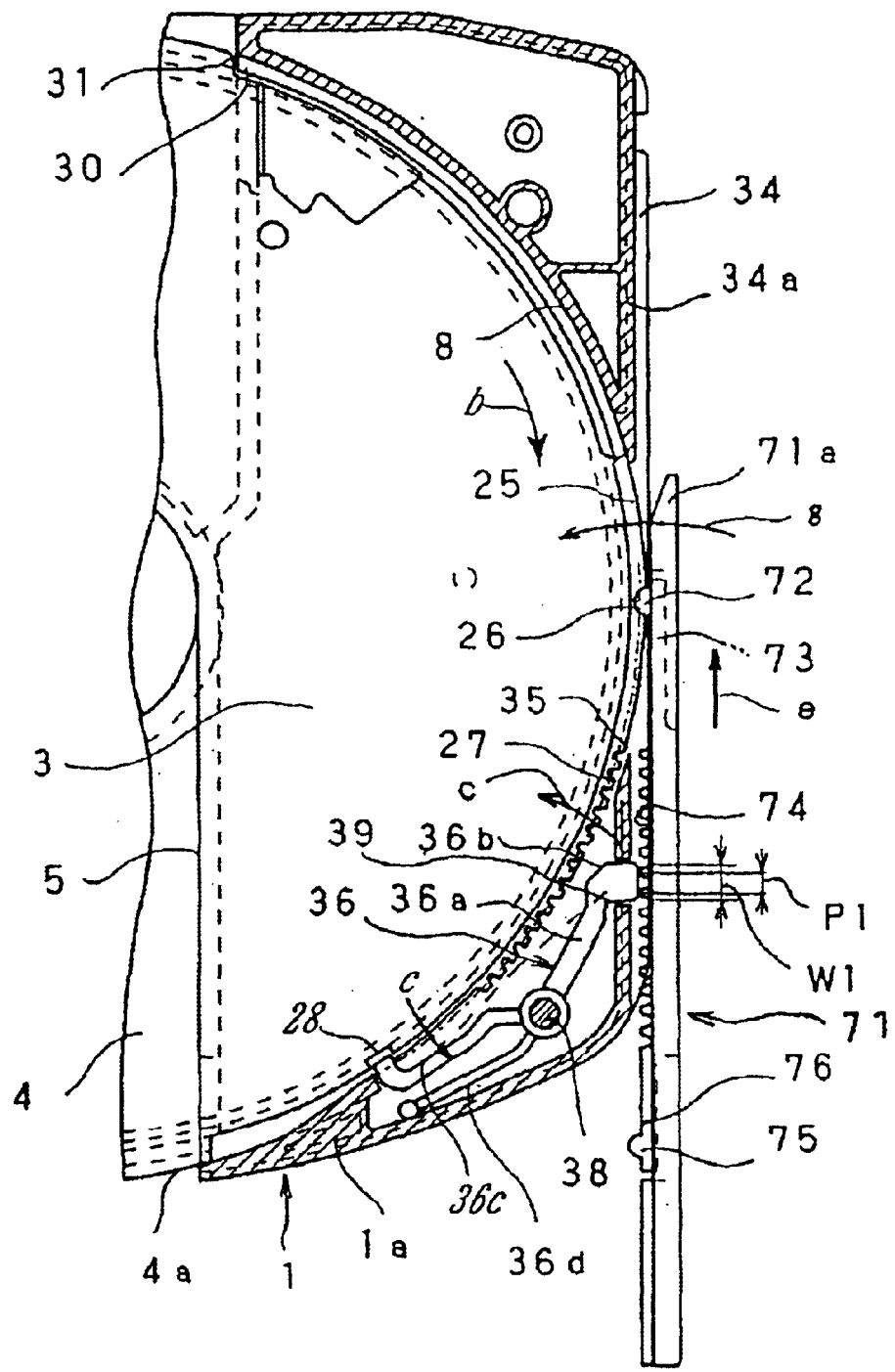
FIG. 4 is a bottom view, with parts partially cutaway, showing a rotational action of the inner rotor continuous to that shown in FIG. 3.

As shown in FIG. 4, when the rack member 71 is further slid in the direction "e", the shutter opening/closing starting projection 72 at the leading end of the rack member 71 is engaged in the shutter opening/closing starting recess 26 of the inner rotor 4 from the direction "g" by the spring force of a mold spring 73. As a result, as the rack member 71 is further slid in the direction "e", the shutter opening/closing ending recess 28 is rotated in the direction "a" by the shutter opening/closing starting projection 72, whereby the inner rotor 4 is started to be rotated in the direction "a" from the shutter opening/closing starting position.

Figure 5:
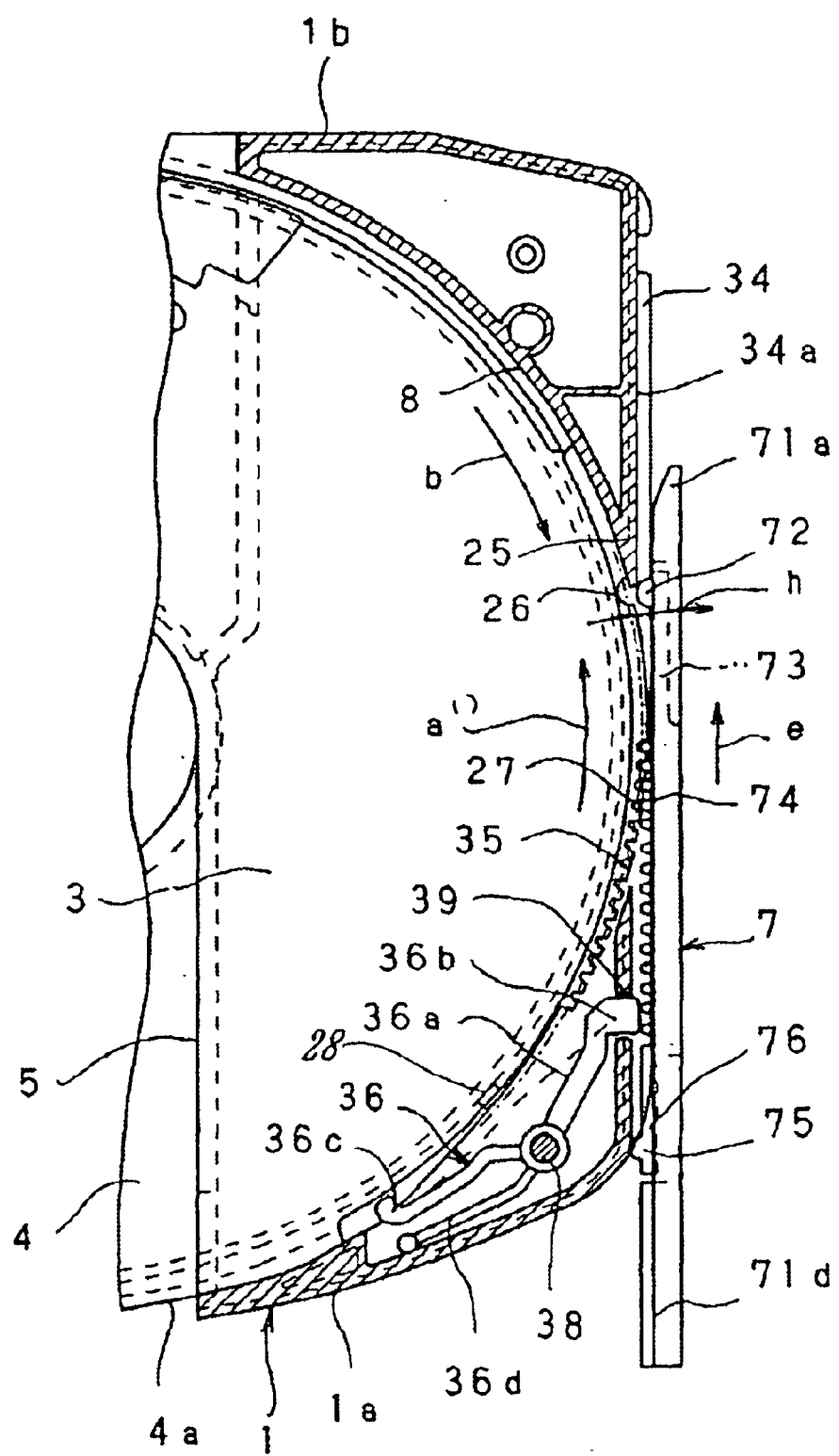
FIG. 5 is a bottom view, with parts partially cutaway, showing a rotational action of the inner rotor continuous to that shown in FIG. 4.
Figure 6:
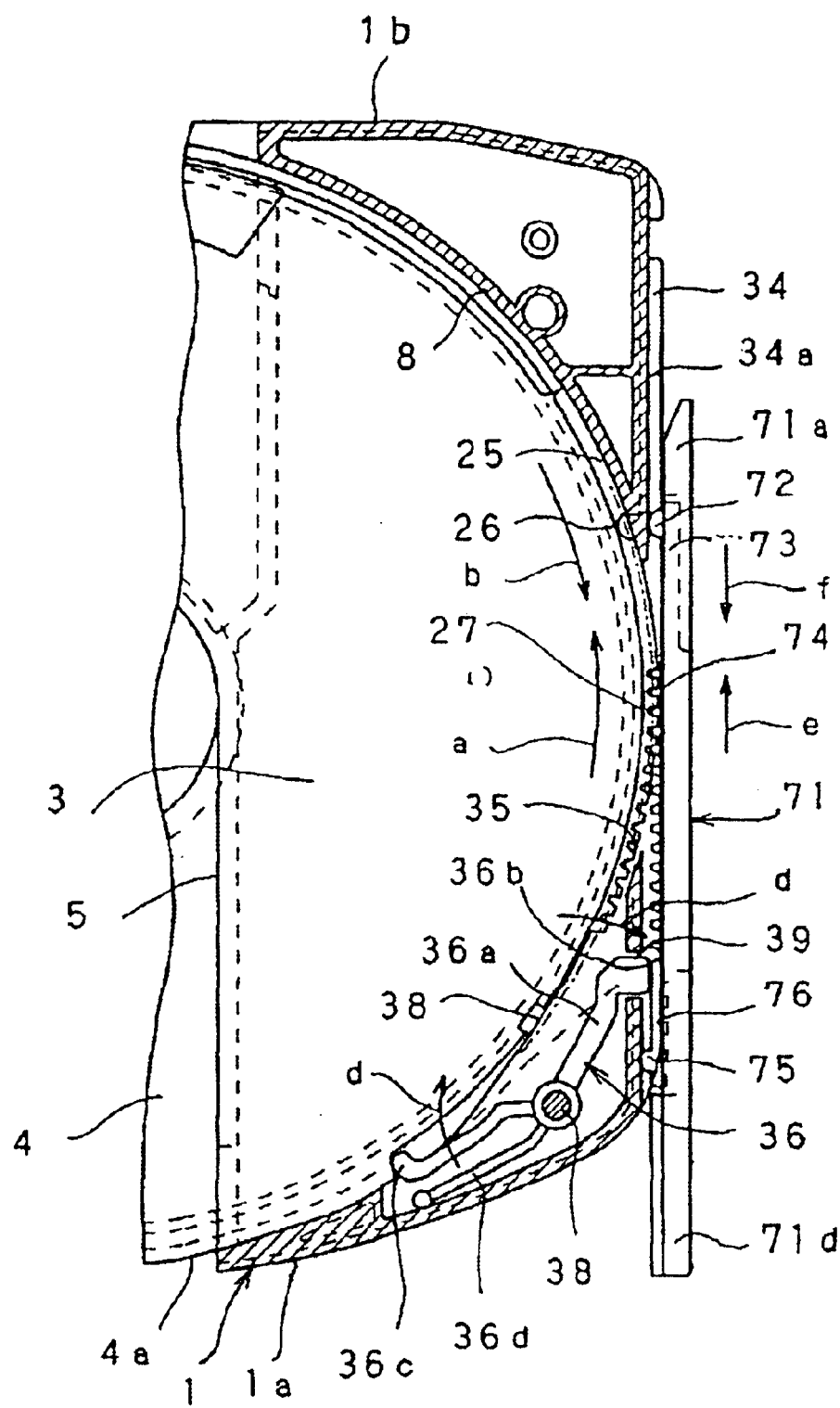
FIG. 6 is a bottom view, with parts partially cutaway, showing a rotational action of the inner rotor continuous to that shown in FIG. 5.

As shown in FIG. 5, when the rack member 71 is further slid in the direction "e", the rack portion 74 of the rack member 71 is meshed with the partial gear 27 on the outer periphery of the inner rotor 4 from the direction "e". Immediately after the meshing of the rack portion 74 with the partial gear 27, the shutter opening/closing starting projection 72 of the rack member 71 is relatively separated from the shutter opening/closing starting recess 26 formed in the outer periphery of the inner rotor 4 in the direction "h".

Since then, as shown in FIGS. 5 to 9, the partial gear 27 of the inner rotor 4 is rotated in a non-slip manner by the rack portion 74 of the rack member 71 further slid in the direction "e", whereby the inner rotor 4 is forcibly rotated in the direction "a" against a rotational slide friction in the disk cartridge 1.

Figure 7:
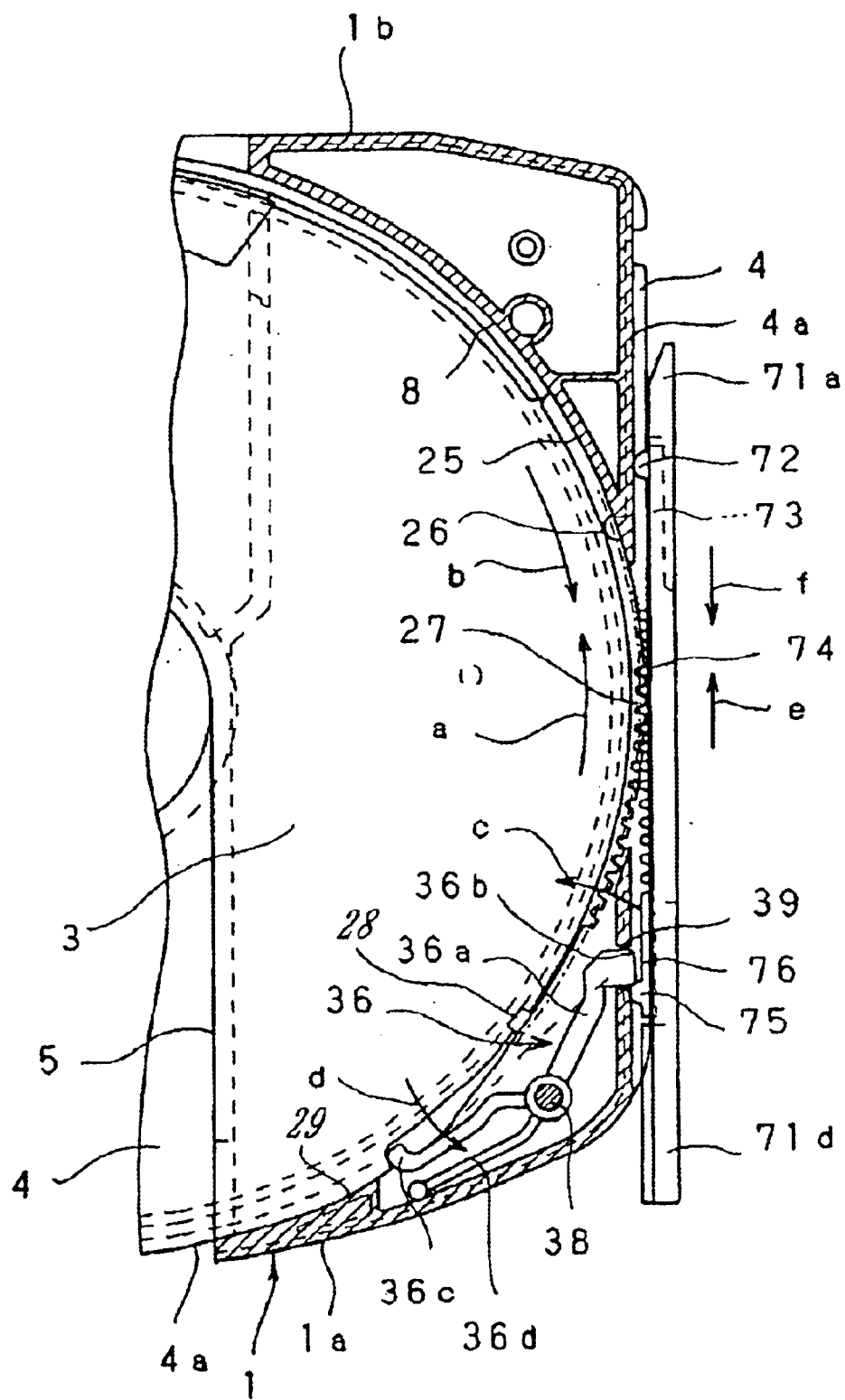
FIG. 7 is a bottom view, with parts partially cutaway, showing a rotational action of the inner rotor continuous to that shown in FIG. 6.
Figure 8:
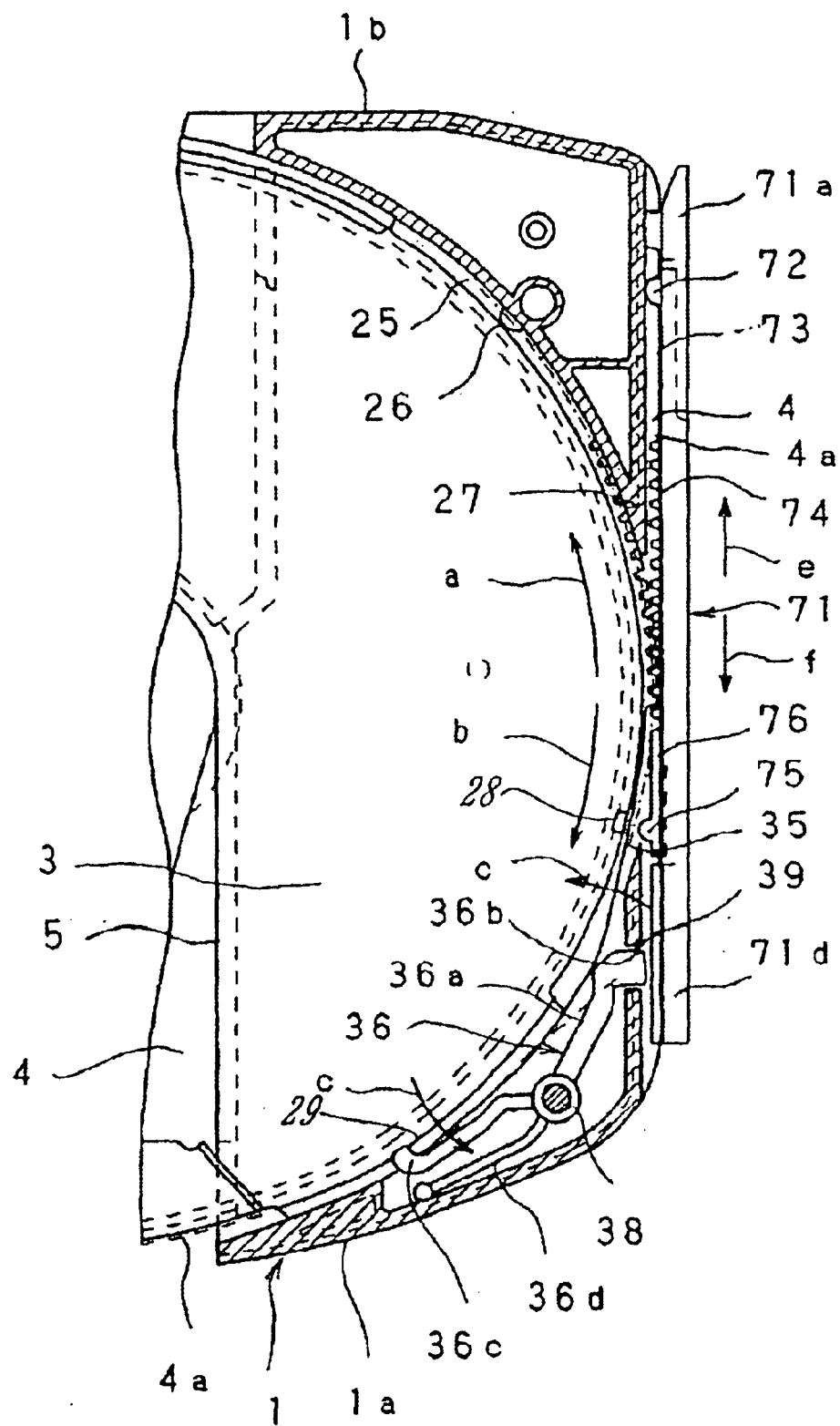
FIG. 8 is a bottom view, with parts partially cutaway, showing a rotational action of the inner rotor continuous to that shown in FIG. 7.

At this time, as shown in FIGS. 7 to 8, during rotation of the partial gear 27 of the inner rotor 4 in the direction "a" by the rack portion 74 of the rack member 71, the leading end 36b of the lock releasing arm 36a of the lock member 36 is pushed again in the direction "c" against a mold spring 76 by a shutter opening/closing ending projection 75 of the rack member 71, with a result that the lock arm 36c relatively rides on a shutter opening/closing ending projection 29 against the spring force of the mold spring 36d. The shutter opening/closing ending projection 29 is integrally molded in a circular-arc shape on the outer peripheral surface 4a of the inner rotor 4.

Figure 9:
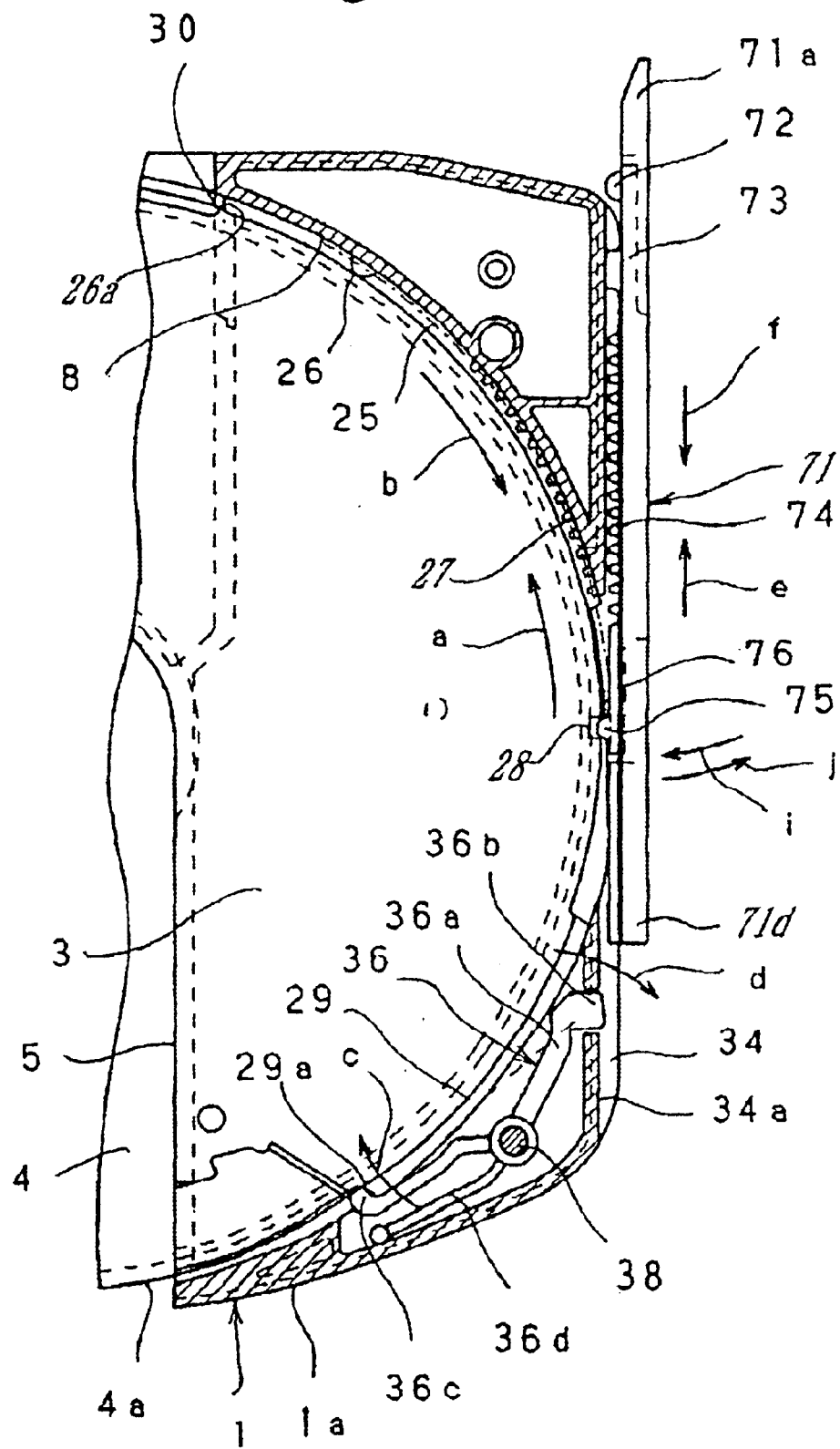
FIG. 9 is a bottom view, with parts partially cutaway, showing the final rotational action of the inner rotor continuous to that shown in FIG. 8.
Figure 10:
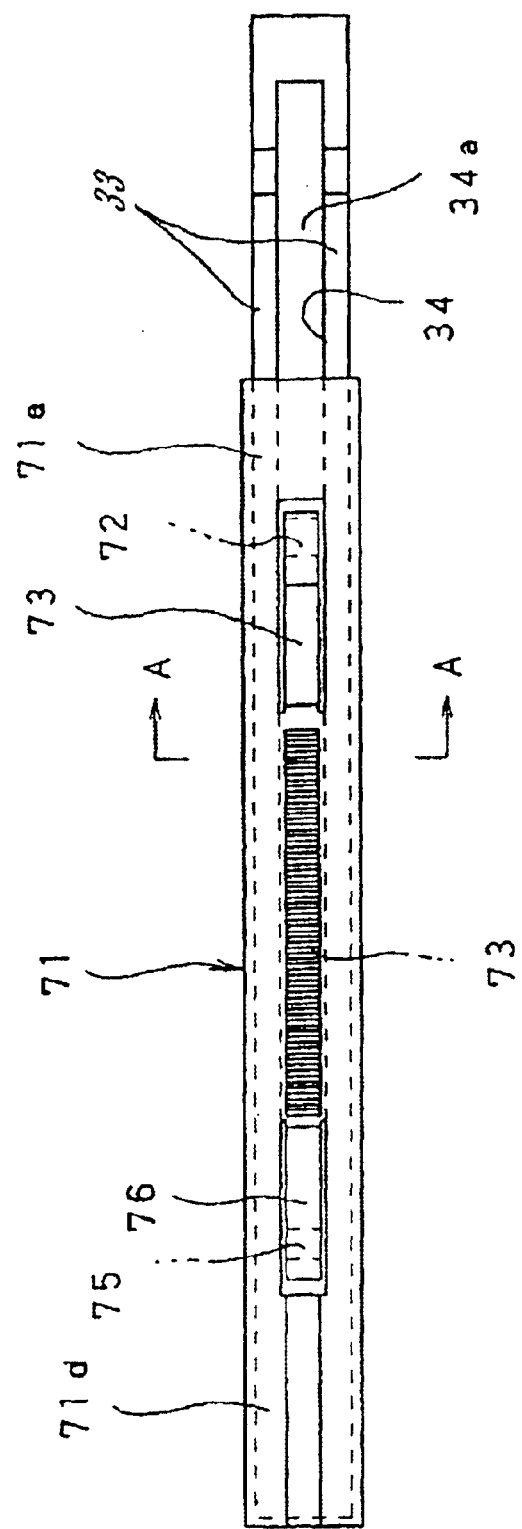
FIG. 10 is a side view of FIG. 6.

FIG. 9 shows a shutter opening/closing ending position of the inner rotor 4. Immediately before the rack member 71 is slid from the position shown in FIG. 8 to the position shown in FIG. 9, the shutter opening/closing ending projection 75 of the rack member 71 is engaged in the shutter opening/closing ending recess 28 formed in the outer periphery of the inner rotor 4 from the direction "i" by the spring force of the mold spring 76, and immediately the rack portion 74 of the rack member 71 is separated from the partial gear 28 on the outer periphery of the inner rotor 4.

As the rack member 71 is further slid in the direction "e" to a sliding motion ending position shown in FIG. 9, the shutter opening/closing ending recess 28 is rotated in the direction "a" by the shutter opening/closing ending projection 75, whereby the inner rotor 4 is rotated in the direction "a" to the shutter opening/closing ending position shown in FIG. 9. An end plane 26a, on the direction "a" side, of the shutter opening/closing starting recess 26 in the outer periphery of the inner rotor 4 comes in contact with an inner rotor stopper 30 provided in the disk cartridge 1 in the direction "a", to stop the inner rotor 4 at the shutter opening/closing ending position. Nearly at the same time, a lock arm 71c of the rack member 71 is dropped in the direction "c" in an end face 29a, on the direction "b" side, of a shutter opening/closing ending projection 29 on the outer periphery of the inner rotor 4 by the spring force of the mold spring 73. As a result, the inner rotor 4 is locked between the inner rotor stopper 30 and the lock arm 71c at the shutter opening/closing ending position.

At this time, as described later, the pair of shutters 9 and 10 are perfectly opened to their shutter opening/closing ending positions, to perfectly open the pickup insertion hole 7 of the disk cartridge 1.

The operation for rotating the inner rotor 4 from the shutter opening/closing ending position shown in FIG. 9 to the shutter opening/closing starting position shown in FIG. 4 by sliding the rack member 71 relative to the disk cartridge 1 in the direction "f", to close the pair of shutters 9 and 10 to their shutter opening/closing starting positions (to be described later), may be reversed to the operation described above.

When the rack member 71 is slid in the direction "f" from the shutter opening/closing ending position shown in FIG. 9, the shutter opening/closing ending recess 28 of the rack member 71 is rotated in the direction "b". At this time, as shown in FIG. 8, the lock arm 36c of the lock member 36 rides on the shutter opening/closing ending projection 29 of the inner rotor 4 against the spring force of the mold spring 36d.

As shown in FIGS. 8 to 5, the rack portion 74 of the rack member 71 is meshed with the partial gear 27 on the outer periphery of the inner rotor 4, and thereby the inner rotor 4 is rotated in a non-slip manner in the direction "b". Since then, as shown in FIG. 4, the shutter opening/closing starting recess 26 in the outer periphery of the inner rotor 4 is rotated in the direction "b" by the shutter opening/closing starting projection 72 of the rack member 71, so that the inner rotor 4 is returned in the direction "b" to the shutter opening/closing starting position. A stopper projection 31 integrally molded on the outer periphery of the inner rotor 4 comes in contact with the inner rotor stopper 30 of the disk cartridge 1 in the direction "b", to stop the inner rotor 4 at the shutter opening/closing starting position. Nearly at the same time, the lock arm 36c of the lock member 36 is engaged in the shutter opening/closing ending recess 28 serving as the locking recess of the inner rotor 4, to lock again the inner rotor 4 at the shutter opening/closing starting position.

As shown in FIGS. 3 to 1, when the rack member 71 is further slid in the direction "f", the shutter opening/closing starting projection 72 is separated from the shutter opening/closing starting recess 26 on the outer periphery of the inner rotor 4 against the spring force of the mold spring 73, so that the rack member 71 is separated from the disk cartridge 1 in the direction "f".

Figure 11:
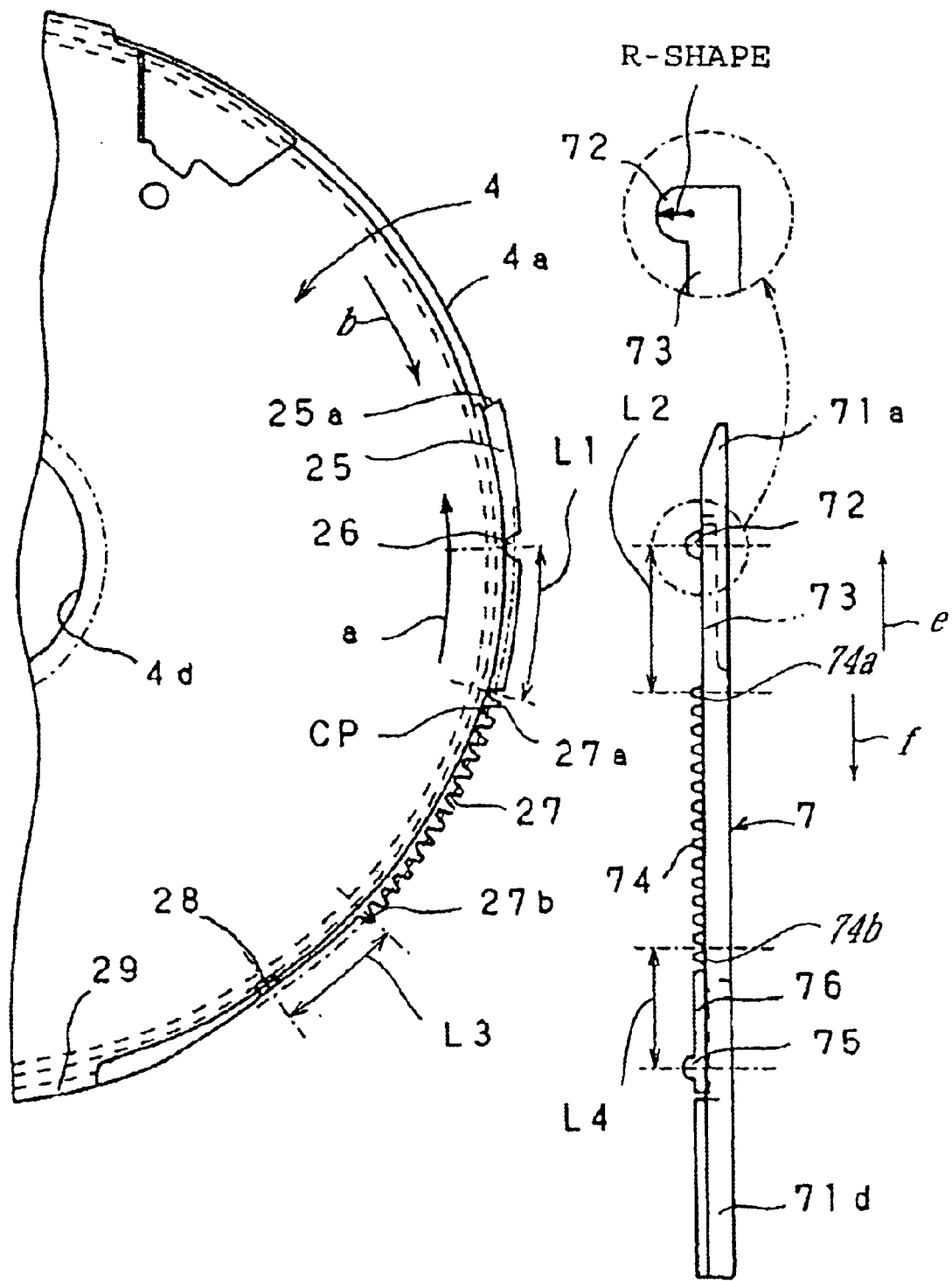
FIG. 11 is a bottom view illustrating a positional relationship between each of a shutter opening/closing starting recess and a shutter opening/closing ending recess of the inner rotor and a partial gear of the inner rotor, and a positional relationship between each of a shutter opening/closing starting projection and a shutter opening/closing ending projection of the rack member and a rack portion of the rack member.
Figure 12:
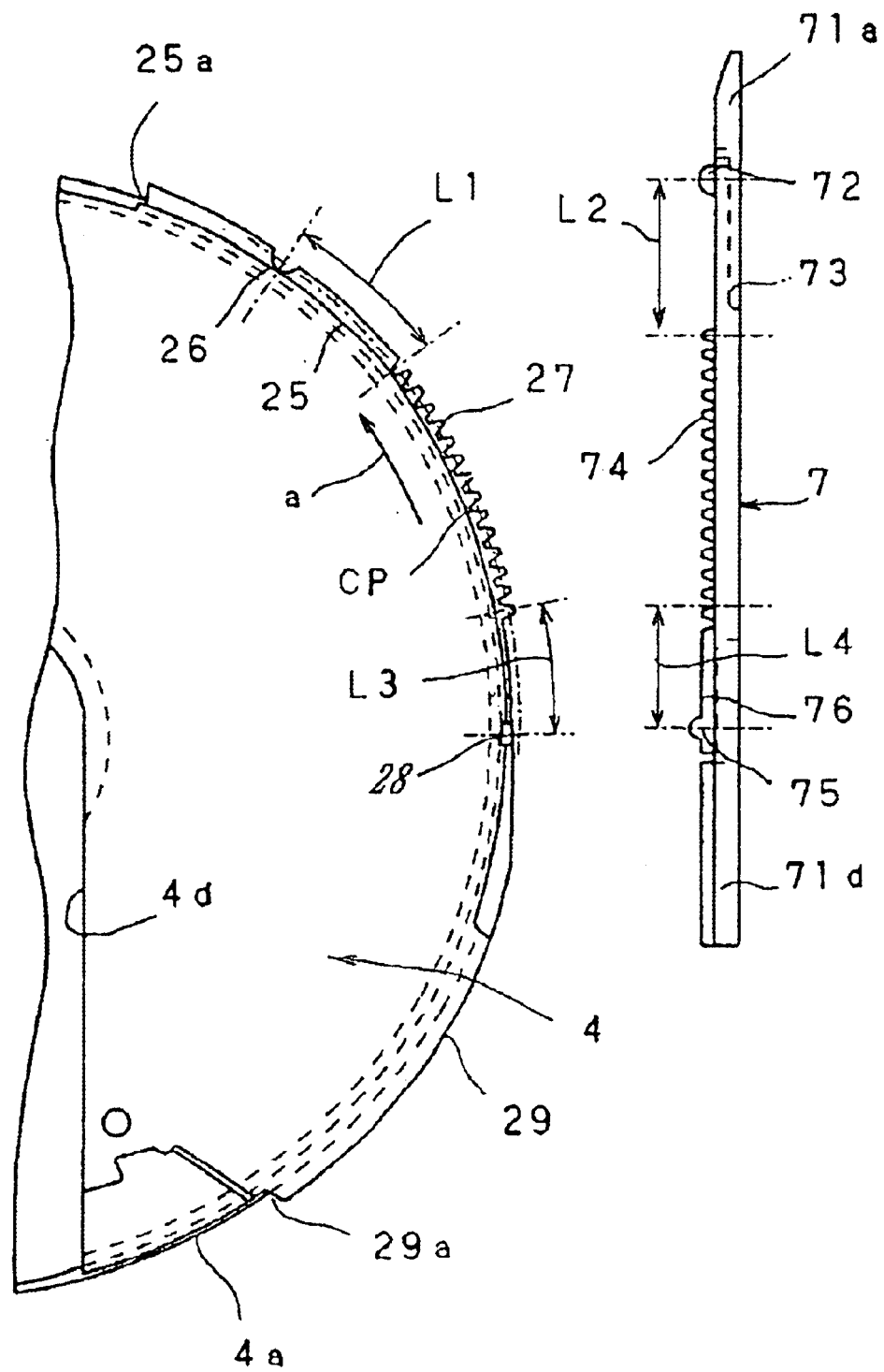
FIG. 12 is a bottom view, similar to FIG. 11.

(2) Description of Relative Relationship between Shutter Opening/Closing Starting Recess, Partial Gear, and Shutter Opening/Closing Ending Recess Provided on Outer Periphery Side of Inner Rotor and Shutter Opening/Closing Starting Projection, Rack Portion, and Shutter Opening/Closing Ending Projection Provided on Rack Member Side The relative relationship between the shutter opening/closing starting recess 26, the partial gear 27, and the shutter opening/closing ending recess 28, which are provided on the outer periphery side of the inner rotor 4 and the shutter opening/closing starting projection 72, the rack portion 74, and the shutter opening/closing ending projection 75, which are provided on the rack member 71 side, will be described with reference to FIGS. 11 and 12. A length L1 (curved along a pitch circle CP of the partial gear 27) between the shutter opening/closing starting recess 26 in the outer periphery of the inner rotor 4 and a first tooth 27a of the partial gear 27 in the direction "a" is set to be equal to a length L2 (=gear module×integer) between the shutter opening/closing starting projection 72 of the rack member 71 and a first tooth 74a of the rack member 74 in the direction "e" (L1=L2). The module and the number of teeth of the partial gear 27 are set to be equal to those of the rack portion 74. A length L3 (curved along the pitch circle CP of the partial gear 27) between a final tooth 27b of the partial gear 27 on the outer periphery of the inner rotor 4 in the direction "a" and the shutter opening/closing ending recess 28 is set to be equal to a length L4 between a final tooth 74b of the rack portion 74 of the rack member 71 in the direction "e" and the shutter opening/closing ending projection 75 (L3=L4).

With this configuration, as described above, it is possible to accurately, positively, and smoothly perform the basic operation for rotating the inner rotor 4 from the shutter opening/closing starting position shown in FIG. 4 to the shutter opening/closing ending position shown in FIG. 9 in the direction "a" by sliding the rack member 71 in the direction "e" so as to sequentially engage and mesh the shutter opening/closing starting projection 72, the rack portion 74, and the shutter opening/closing ending projection 75 of the rack member 71 with the shutter opening/closing starting recess 26, the partial gear 27, and the shutter opening/closing ending recess 28 in the outer periphery of the inner rotor 4; and similarly, it is possible to accurately, positively, and smoothly perform the basis operation for rotating the inner rotor 4 in the direction "b" by sliding the rack member 71 in the direction "f" so as to sequentially engage and mesh the shutter opening/closing ending projection 75, the rack portion 74, and the shutter opening/closing starting projection 72 of the rack member 71 with the shutter opening/closing ending recess 28, the partial gear 27, and the shutter opening/closing starting recess 26 in the outer periphery of the inner rotor 4.

Accordingly, even for any type of inserting the disk cartridge 1 in a disk drive unit 61 to be described later (for example, a slot-in type or tray type), the operation for opening/closing the shutters by rotating the inner rotor 4 can be, usually, positively, and smoothly performed.

The circular-arc shaped shutter opening/closing starting projection 25 is formed between the shutter opening/closing starting recess 26 and the first tooth 27a of the partial gear 27 on the outer periphery of the inner rotor 4, and accordingly, the partial gear 27 is not present therebetween. As a result, when the rack member 71 is slid in the direction "e" or "f" to slide the shutter opening/closing starting projection 72 between the shutter opening/closing recess 26 and the first tooth 27a of the partial gear 27, the shutter opening/closing starting projection 72 can smoothly ride on or get off the shutter opening/closing starting projection 72. This makes it possible to prevent occurrence of clicks due to sliding motion of the shutter opening/closing starting projection 25 on the partial gear 27.

As typically shown in FIG. 4, the width W1 of the leading end 36b (the contact surface with the rack member 74) of the lock releasing arm 36a of the lock member 36 in the length direction of the rack portion 74 is set to be sufficiently larger than a pitch P1 of the rack portion 74. Accordingly, when the tooth tip of the rack portion 74 is slid on the leading end 36b of the lock releasing arm 36a in the direction "e" or "f" to push down the leading end 36b in the direction "c" against the mold spring 36d, any click does not occur. As a result, the rack portion 74 can be smoothly slid in the direction "e" or "f" to positively push down the lock releasing arm 36a in the direction "c".

At this time, as shown in FIGS. 11 and 12, each of the leading ends of the shutter opening/closing starting projection 72 and the shutter opening/closing ending projection 75 of the rack member 71 is rounded (formed into an R-shape). Accordingly, when the shutter opening/closing starting projection 72 and the shutter opening/closing ending projection 75 are engaged in or released from the shutter opening/closing starting recess 26 and the shutter opening/closing ending recess 28 in the outer periphery of the inner rotor 4 as described above, it is possible to reduce a load required for engagement or disengagement.

Accordingly, it is possible to rotate the inner rotor 4 in the direction "a" or "b" by the rack member 71 with a low torque and hence to smoothly open/close the shutters 9 and 10, and also it is possible to prevent wear and damage between the shutter opening/closing starting projection 72 and the shutter opening/closing starting recess 26 and between the shutter opening/closing ending projection 75 and the shutter opening/closing ending recess 28.

(3) Description of Reference Surface to Rack Member Defined by Side Surface of Disk Cartridge A reference surface 33 defined by one side surface of the disk cartridge 1 will be described with reference to FIGS. 13 to 16. As will be described later, upper and lower shells 2 and 3 of the disk cartridge 1 are made from a molding material such as a synthetic resin. The recessed groove 34 is formed in one side surface 1c in such a manner as to horizontally extend in a central portion in the thickness direction, that is, the vertical direction. Upper and lower portions, on both sides of the recessed groove 34, of the side surface 1c, are accurately finished, to be taken as the reference surfaces 33.

Figure 14A:
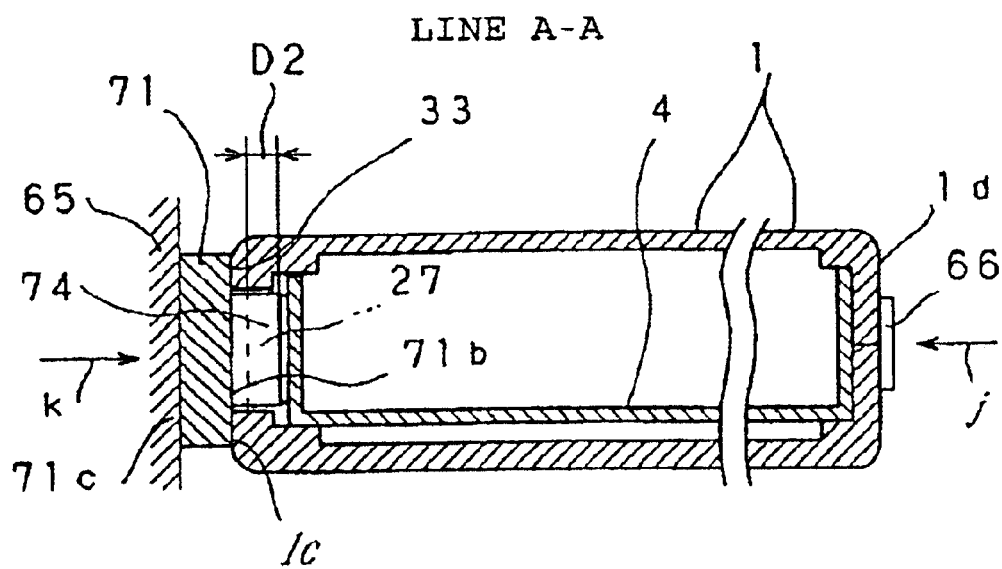
FIGS. 14A and 14B are sectional view taken on line A—A of FIG. 10, with parts partially cutaway.
Figure 15:
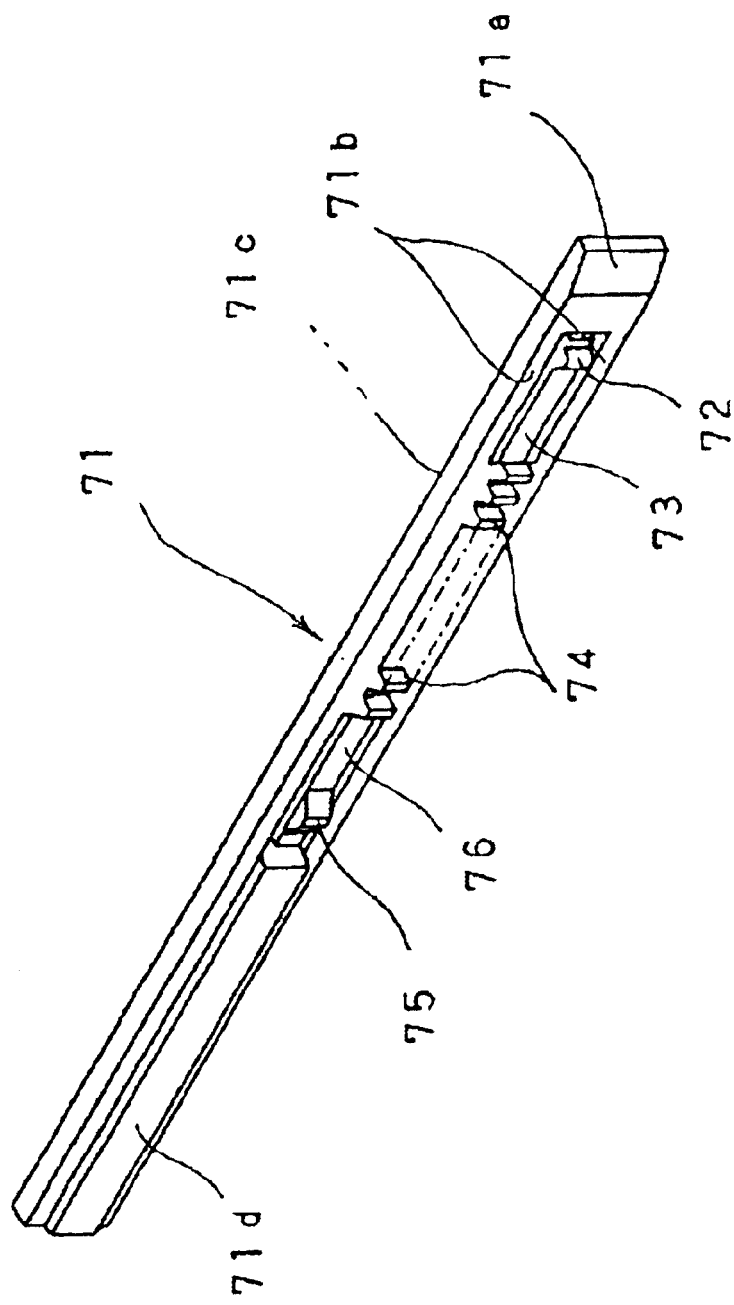
FIG. 15 is a perspective view of the rack member.
Figure 16:
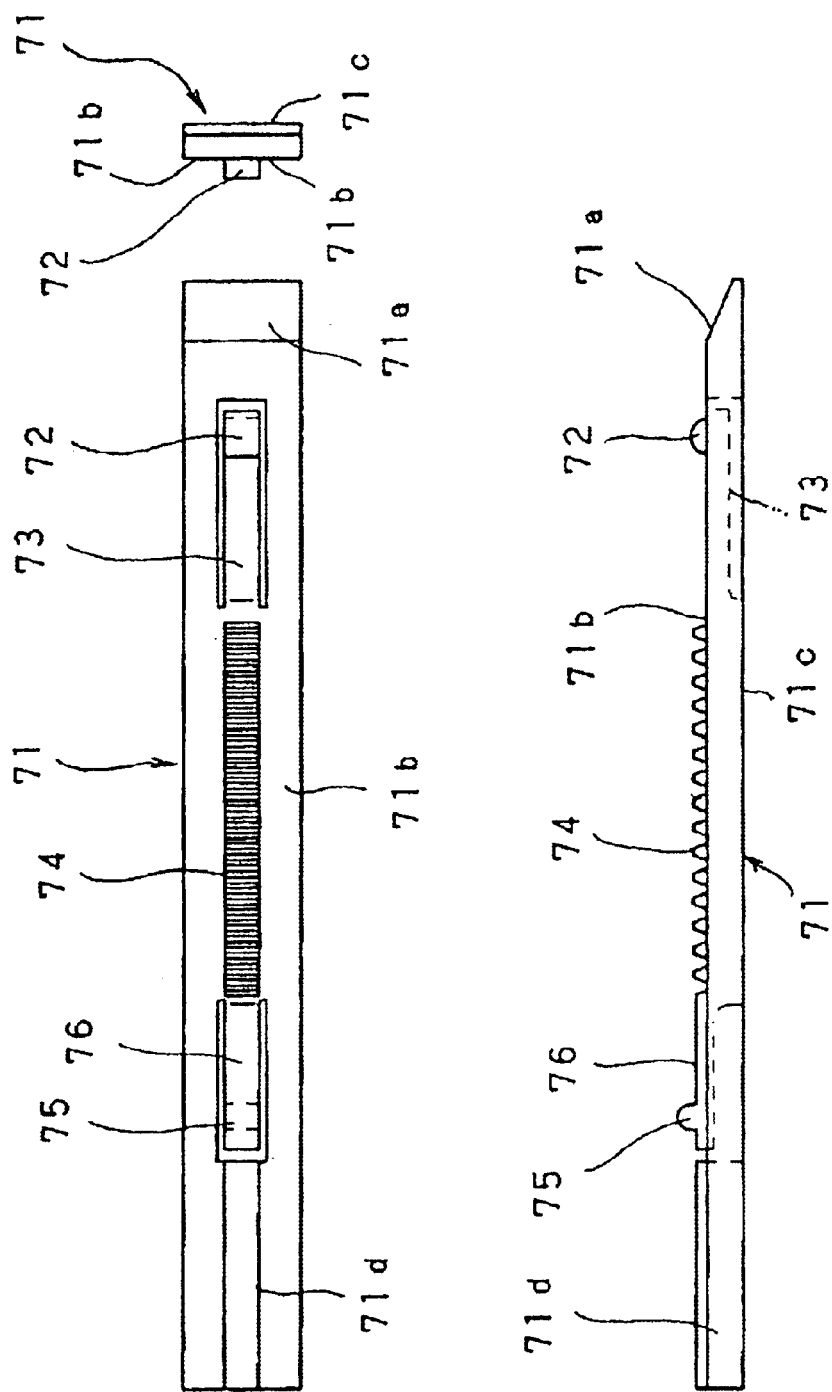
FIG. 16 is a view showing the side surface, bottom surface, and upper surface of the rack member.

On the other hand, in one example of the rack member 71 shown in FIGS. 14A, 15, and 16, the rack member 71 is molded from a molding material such as a synthetic resin into a nearly strip shape, wherein the shutter opening/closing starting projection 72, the mold spring 73, the rack portion 74, the shutter opening/closing ending projection 75, and the mold spring 76 are integrally molded on one side surface 71b of the rack member 71 in such a manner as to be arranged in one row (horizontally) along a central line in the width direction (vertical direction) of the side surface 71b.

Accordingly, when the inner rotor 4 is rotated, the rack member 71 is accurately guided by means of the reference surfaces 33. The rotation of the inner rotor 4 is performed as described above with reference to FIGS. 2 to 9. Namely, the rack member 71 is slid relative to the disk cartridge 1 in the direction "e" or "f" along one side surface 1c of the disk cartridge 1, whereby the shutter opening/closing starting projection 72, the rack portion 74, and the shutter opening/closing ending projection 75 of the rack member 71 are moved along the recessed groove 34 of the disk cartridge 1 in the direction "e" or "f". As a result, the shutter opening/closing starting projection 72, the rack portion 74, and the shutter opening/closing ending projection 75 of the rack member 71 are sequentially engaged and meshed with the shutter opening/closing starting recess 26, the partial gear 27, and the shutter opening/closing ending recess 28 formed in the outer periphery of the inner rotor 4, whereby the inner rotor 4 is rotated in the direction "a" or "b". At this time, the upper and lower sides of the side surface 71b of the rack member 71 can be accurately guided by the upper and lower reference surfaces 33 on both the sides of the recessed groove 34 of the disk cartridge 1.

Figure 13:
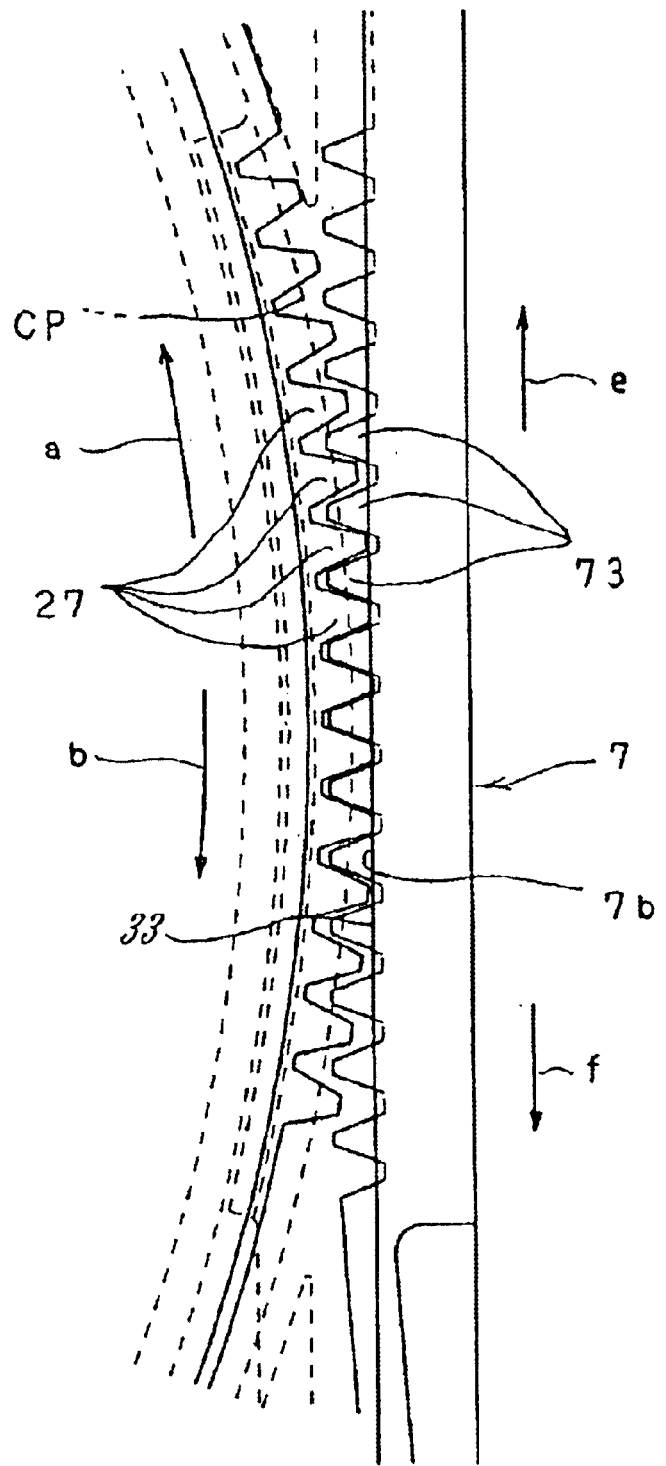
FIG. 13 is an enlarged bottom view of a meshing portion at which the partial gear of the inner rotor is meshed with the rack portion of the rack member.

Accordingly, as shown in FIGS. 13 and 14A, an engagement (meshing) depth between each of the shutter opening/closing starting projection 72, the rack portion 74, and the shutter opening/closing ending projection 75 of the rack member 71 and the corresponding one of the shutter opening/closing starting recess 26, the partial gear 27, and the shutter opening/closing ending recess 28 of the inner rotor 4 can be usually, accurately specified to a designed value D2.

As a result, even if dimensions of the above-described components are somewhat varied, as described above, the inner rotor 4 can be accurately, positively rotated in a non-slip manner in the direction "a" or "b" by sliding the rack member 71 in the direction "e" or "f", to thereby usually, positively open/close the shutters 9 and 10. This is advantageous in that the operation of opening/closing the shutters 9 and 10 can be positively performed irrespective of the type of inserting the disk cartridge 1 in the disk drive unit 61 (for example, the slot-in type or tray type).

In the example shown in FIG. 14A, the other side surface 71c (opposed to the disk cartridge 1 side) of the rack member 71 is received by a sliding reference portion 65 formed on a cartridge holder 64 (to be described later). In such a state, the other side surface 1d of the disk cartridge 1 is pushed from the direction "j" by a side pressing spring 66 such as a plate spring or a coil spring, and by the reaction force caused by the biasing force of the side pressing spring 66, the upper and lower sides of the one side surface 71b of the rack member 71 are elastically pushed from the direction "k" to the reference surfaces 33 of the disk cartridge 1.

With this configuration, it is possible to more positively prevent the variations in engagement (meshing) depth D2 due to the variations in dimensions of the parts, and hence to ensure the high reliability.

Figure 14B:
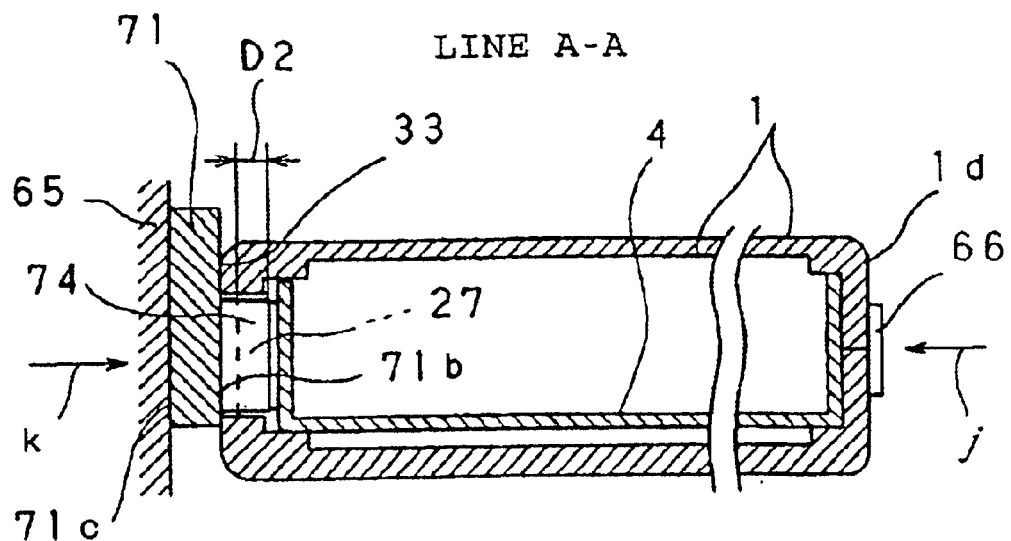

If the arrangement of the sliding reference portion 65 and the side pressing spring 66 shown in FIGS. 14A and 14B are reversed in the right-and-left direction, the same effect as that described above can be obtained.

In an example shown in FIG. 14B, the shutter opening/closing starting projection 72, the mold spring 73, the rack portion 74, the shutter opening/closing ending projection 75, and the mold spring 76 of the rack member 71 are provided at positions offset upwardly or downwardly from the center line in the width direction (vertical direction) of the rack member 71, wherein one side surface 71b of the rack member 71 is guided by only one of the upper and lower reference surfaces 33 on both the sides of the recessed groove 34 of the disk cartridge 1. Even in this case, the same effect as that described above can be obtained.

(4) Description of Rack Member

Figure 17:
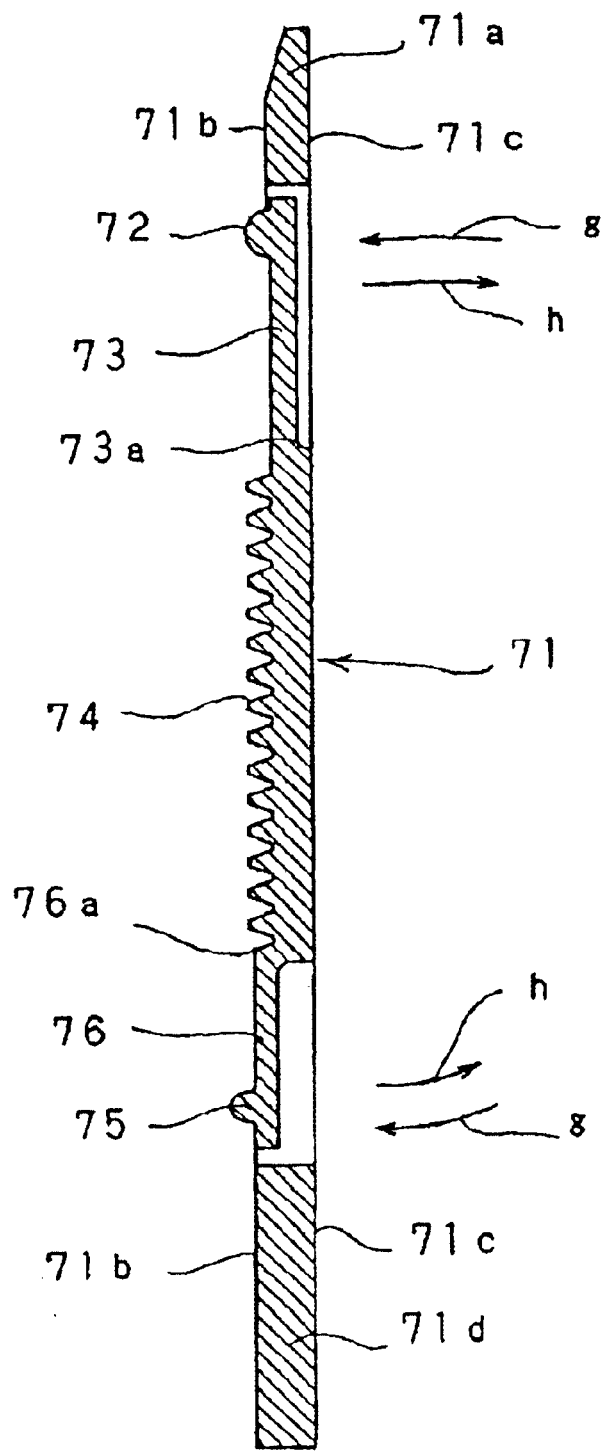
FIG. 17 is a sectional bottom view of a basic form of the rack member.
Figure 18:
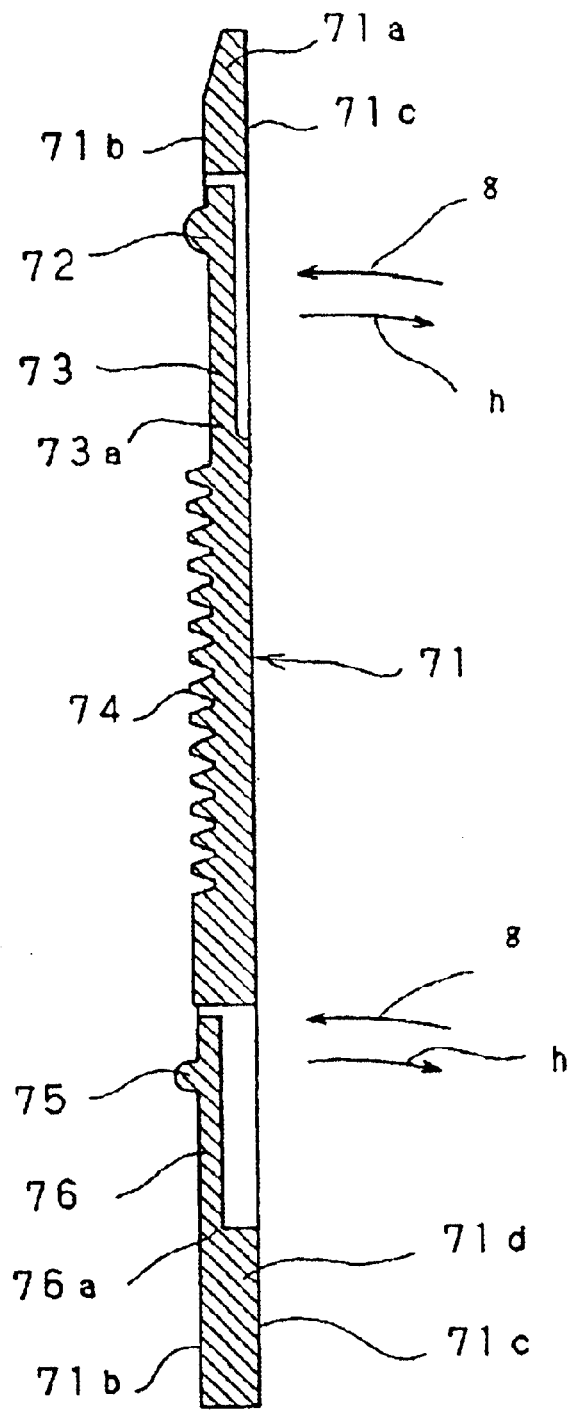
FIG. 18 is a sectional bottom view of a first modification of the rack member.
Figure 19:
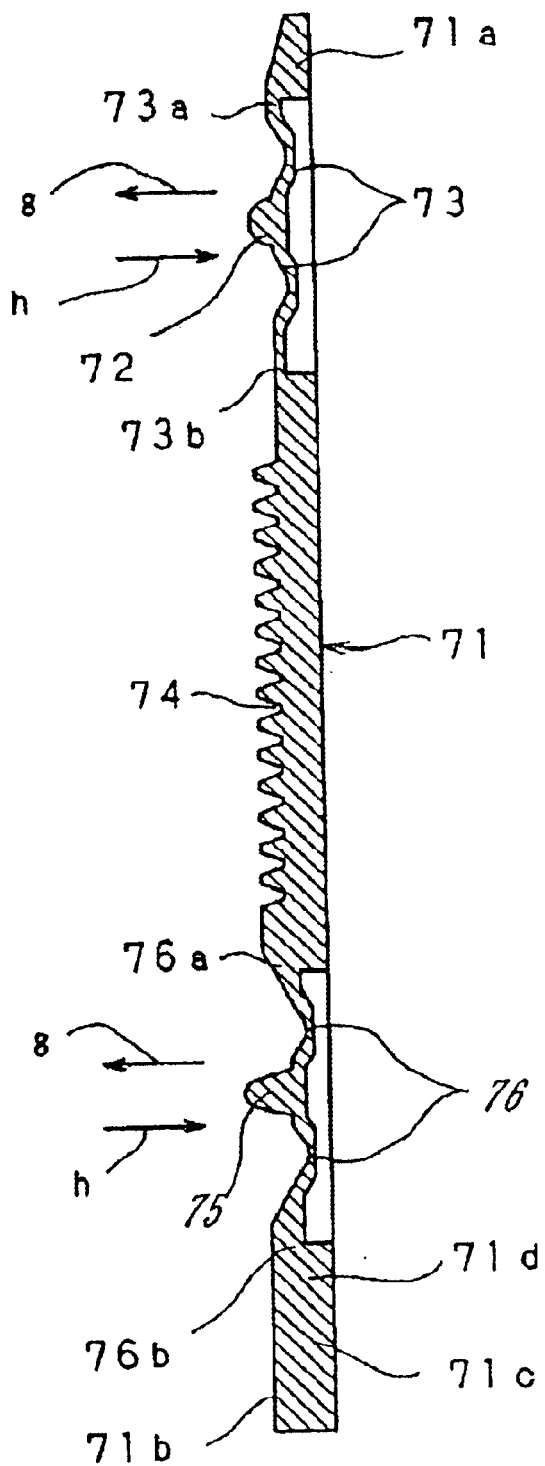
FIG. 19 is a sectional bottom view of a second modification of the rack member.

The supporting structure for supporting the shutter opening/closing starting projection 72 and the shutter opening/closing ending projection 75 of the rack member will be described with reference to FIGS. 17 to 20. FIGS. 17, 18, and 19 each show a supporting structure formed on the rack member 71, wherein when the rack portion 74 is molded from a molding material of a synthetic resin on the rack member 71, the shutter opening/closing starting projection 72, the mold spring 73, the shutter opening/closing ending projection 75, and the mold spring 76 are also integrally molded on the rack member 71.

In an example shown in FIG. 17, the shutter opening/closing starting projection 72 and the shutter opening/closing ending projection 75 are supported by leading ends of the mold springs 73 and 76 in a cantilever manner, respectively. The mold springs 73 and 76 are formed in such a manner that the leading ends thereof are reversed to each other along the length direction of the rack member 71 (the directions "e" and "f"). Connection points 73a and 76a of the mold springs 73 and 76 to the rack member 71 are disposed at inner positions of both ends 71a and 71d of the rack member 71, respectively.

In an example shown in FIG. 18, the shutter opening/closing starting projection 72 and the shutter opening/closing ending projection 75 are similarly supported by leading ends of the mold springs 73 and 76 in a cantilever manner, respectively. The mold springs 73 and 76, however, are formed in such a manner that the leading ends thereof are directed in the same direction, and connection points 73a and 76a of the mold springs 73 and 76 to the rack member 71 are also directed in the same direction.

In an example shown in FIG. 19, the shutter opening/closing starting projection 72 and the shutter opening/closing ending projection 75 are supported by central portions of the mold springs 73 and 76, respectively. Both ends of the mold spring 73 in the directions "e" and "f" are connected to the rack member 71 at connection points 73a and 73b, and similarly both ends of the mold spring 76 in the direction "e" and "f" are connected to the rack member 71 at connection points 76a and 76b.

With this configuration, the shutter opening/closing starting projection 72 and the shutter opening/closing ending projection 75 are supported by the mold springs 73 and 76 in such a manner as to be movable in the directions "g" and "h" where the shutter opening/closing starting projection 72 and the shutter opening/closing ending projection 75 are engageable with or releasable from the shutter opening/closing starting recess 26 and the shutter opening/closing ending recess 28, respectively. Accordingly, it is possible to usually, positively perform the basic operation of deeply, positively engaging the shutter opening/closing starting projection 72 and the shutter opening/closing ending projection 75 with the shutter opening/closing starting recess 26 and the shutter opening/closing ending recess 28 in the direction "g" by the spring forces of the mold springs 73 and 76, respectively. Similarly, it is possible to smoothly perform the basic operation of releasing the shutter opening/closing starting projection 72 and the shutter opening/closing ending projection 75 from the shutter opening/closing starting recess 26 and the shutter opening/closing ending recess 28 in the direction "h" against the spring forces of the mold springs 73 and 76, respectively.

The molded monolithic structure shown in FIG. 17 to 19 is also advantageous in production cost because such a structure can eliminate the need of provision of steps of forming the shutter opening/closing starting projection 72 and the shutter opening/closing ending projection 75 separately from the rack member 71 and then assembling them to the rack member 71.

Figure 20:
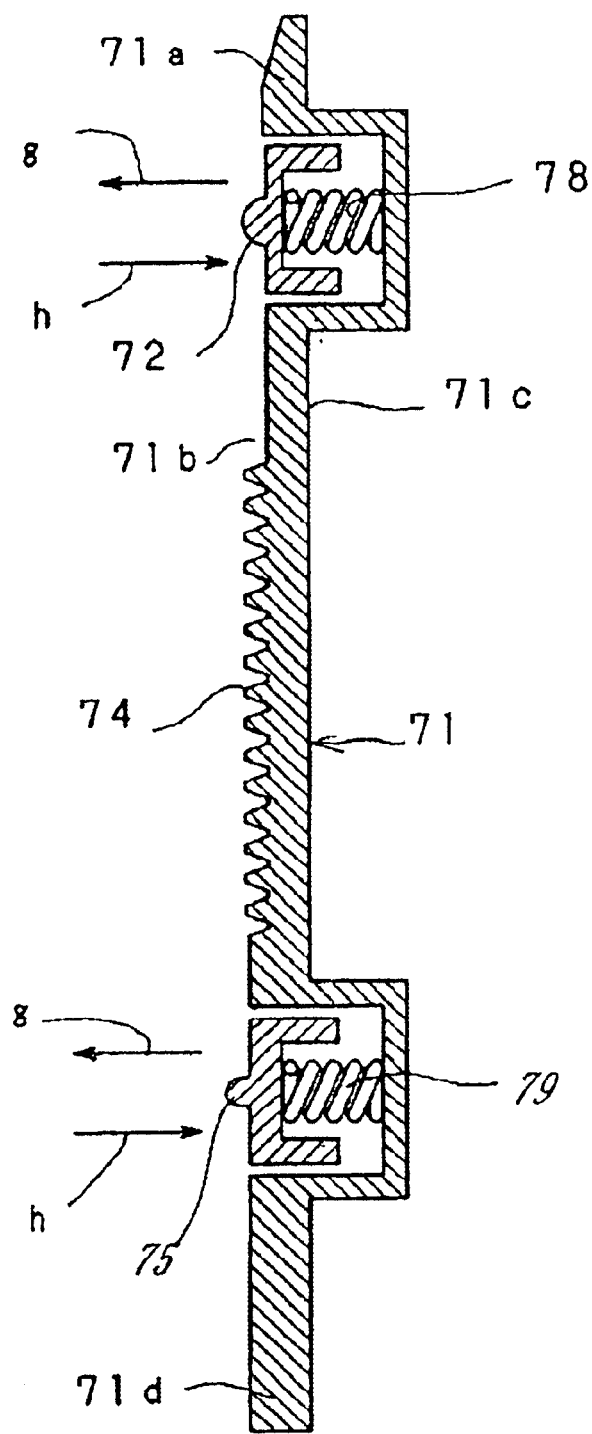
FIG. 20 is a sectional bottom view of a third modification of the rack member.
Figure 21:
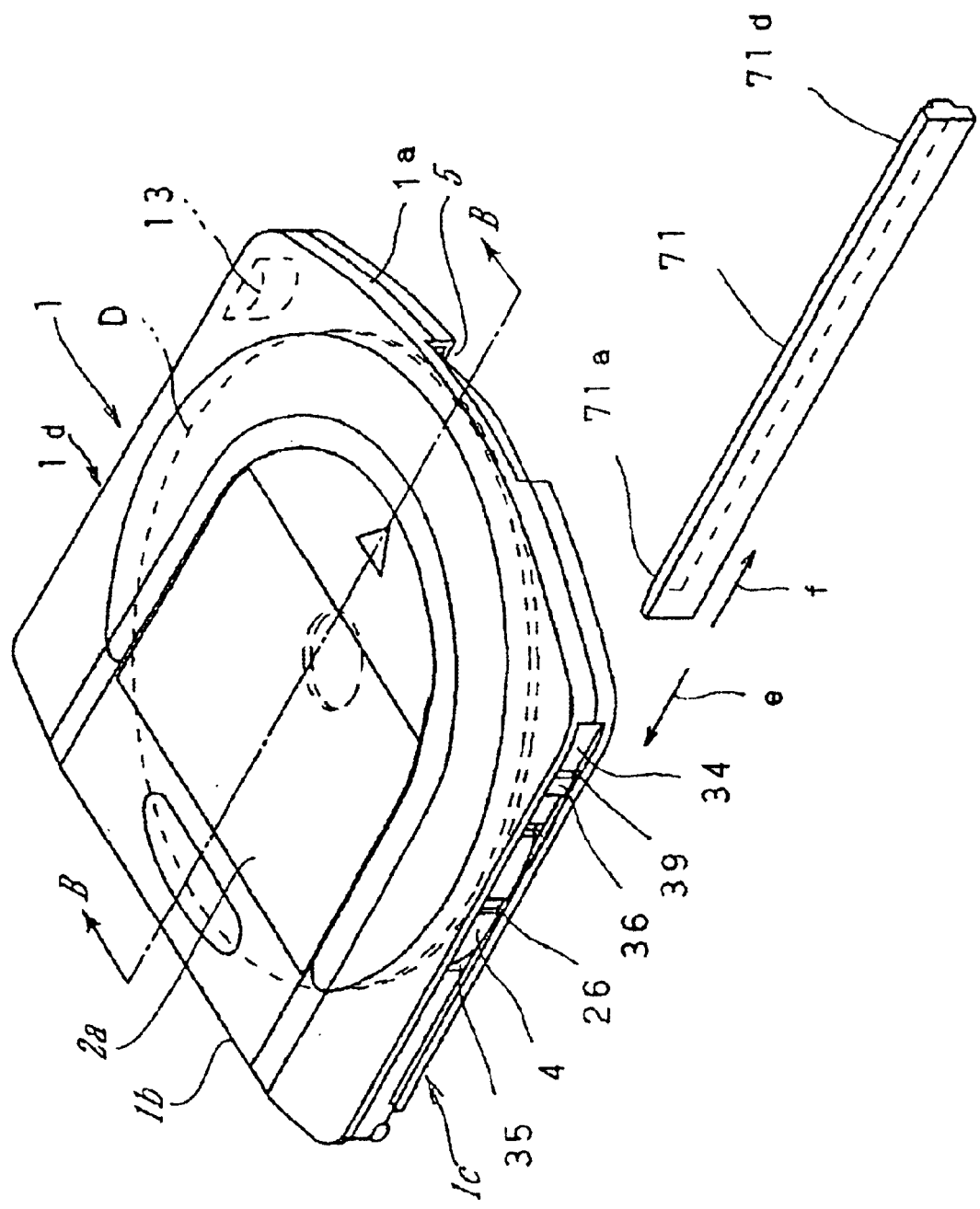
FIG. 21 is a perspective view of a disk cartridge and a rack member.

In an example shown in FIG. 20, the shutter opening/closing starting projection 72 and the shutter opening/closing ending projection 75 are supported by spring members 78 and 79 such as coil springs or plate springs in such a manner as to be movable in the directions "g" and "h". Even in this case, it is possible to positively, smoothly perform the basic operation of engaging or releasing the shutter opening/closing starting projection 72 and the shutter opening/closing ending projection 75 with or from the shutter opening/closing starting recess 26 and the shutter opening/closing ending recess 28 in the direction "g" or "h".

(5) Description of Disk Cartridge Using Inner Rotor

The disk cartridge 1 using the inner rotor 4 will be described with reference to FIGS. 21 to 24. First, as shown in FIGS. 21 to 24, the disk cartridge 1 includes an upper shell 2 and a lower shell 3, the inner rotor 4, and the pair of shutters 9 and 10, each of which is molded from a molding material such as a synthetic resin. The upper and lower shells 2 and 3, which have nearly symmetric shapes, are vertically assembled into the disk cartridge 1 having a flat, nearly square. A front surface 1a of the disk cartridge 1 is curved into a gentle circular-arc. A rear surface 1b of the disk cartridge 1 is flattened and has, at right and left ends, symmetric taper portions. Left and right side surfaces 1c and 1d of the disk cartridge 1 are formed so as to be in parallel to each other. The above-described recessed groove 34 is formed in one side surface 1c in such a manner as to horizontally extend along a central portion of the side surface 1c in the thickness direction. As described above, the window hole 35 and the hole 39 are opened in the bottom surface 34a of the recessed groove 34. The pickup insertion hole 5 having a slot shape is formed so as to extend from a nearly central portion of the lower shell 3 to a central portion of the front surface 1a.

The inner rotor 4 is formed into a circular dish shape. An outer peripheral wall 4c having a circular shape is integrally formed on the outer periphery of a bottom portion 4b of the inner rotor 4. An opening portion 4d having the same shape as that of the pickup insertion hole 5 of the lower shell 3 is formed in the bottom portion 4b in such a manner as to extend from a central portion to the outer periphery of the bottom portion 4b. The inner rotor 4 is horizontally assembled in and rotatably mounted to a circular rotor housing portion 8 formed between the upper and lower shells 2 and 3. A disk housing portion 6 is formed as a space that is surrounded by the outer peripheral wall 4c of the inner rotor 4 over the bottom portion 4b thereof. A disk D as a disk-like recording medium, for example, a DVD is horizontally housed in the disk housing portion 6 in such a manner as to be rotatable and vertically movable by a specific distance.

A clamper supporting ring 12 is fixed on the back surface of the upper shell 2 by welding or the like. A disk damper 11, which is formed into a nearly disk-shape from a ferromagnetic material, is mounted on a central portion of the back surface of the upper shell 2 by the clamper supporting ring 12. The disk clamper 11 is supported in such a manner as to be rotatable relative to the upper shell 2 and to be vertically movable by a distance in a specific range. A swelled portion 2a having a nearly U-shape is formed on a central portion of the upper surface of the upper shell 2. In addition, a semi-circular locking recess 13 is formed in the side surface 1d of the disk cartridge 1 at a position offset to the front surface 1a side.

A shutter housing space 7 is horizontally formed between the bottom portion 4b of the inner rotor 4 and the lower shell 3. The pair of shutters 9 and 10, each of which is formed as a thin plate having a nearly semi-circular shape, are housed in the shutter housing space 7 at the same level.

A shutter opening/closing mechanism 16 for opening/closing the pair of shutters 9 and 10 by rotating the inner rotor 4 is assembled between the bottom portion 4b of the inner rotor 4 and the lower shell 3. The shutter opening/closing mechanism 16 is configured as a so-called cam mechanism including a pair of turning fulcrum pins 17 and 18, a pair of cam grooves 19 and 20, and a pair of cam pins 21 and 22. The turning fulcrum pins 17 and 18 are integrally molded on the back surface of the bottom portion 4b of the inner rotor 4 at positions opposed to each other by 180°. The turning fulcrum pins 17 and 18 are turnable integrally with the inner rotor 4 while rotatably supporting opposed ends of the pair of shutters 9 and 10. The cam grooves 19 and 20 are formed in opposed end portions of the pair of shutters 9 and 10 in such a manner as to extend nearly in parallel to each other. The cam pins 21 and 22 as fixed pins are integrally molded on the bottom portion 4b of the lower shell 3 at positions opposed to each other by 180°.

(6) Description of Shutter Opening/Closing Mechanism Opened/Closed by Rotation of Inner Rotor The opening/closing motion of the shutter opening/closing mechanism 16 opened/closed by rotation of the inner rotor 4 will be described with reference to FIGS. 25 to 32. As shown in FIGS. 22, 26, and 28, in the state that the inner rotor 4 remains as having been rotated and returned in the direction "b" to the shutter opening/closing starting position (=shutter closing position) as described above, the shutter opening/closing mechanism 16 turns the pair of shutters 9 and 10 around the pair of turning fulcrum-pins 17 and 18 in the direction "m", to make the shutters 9 and 10 close to each other at shutter closing positions obliquely crossing the vicinity of the center of the pickup insertion hole 5. Tilt planes 9a and 10a for overlap are vertically symmetrically formed on the shutters 9 and 10 so as to extend along Z-shaped edges thereof. In the shutter closing state, these tilt planes 9a and 10a are vertically overlapped to each other, to close a central opening portion at which the opening portion 4d of the inner rotor 4 is overlapped to the pickup insertion hole 5 of the lower shell 3.

As a result, in the shutter closing state, the entire region of the pickup insertion hole 5 of the lower shell 3 is perfectly closed with the bottom portion 4b of the inner rotor 4 and the pair of shutters 9 and 10.

Figure 27:
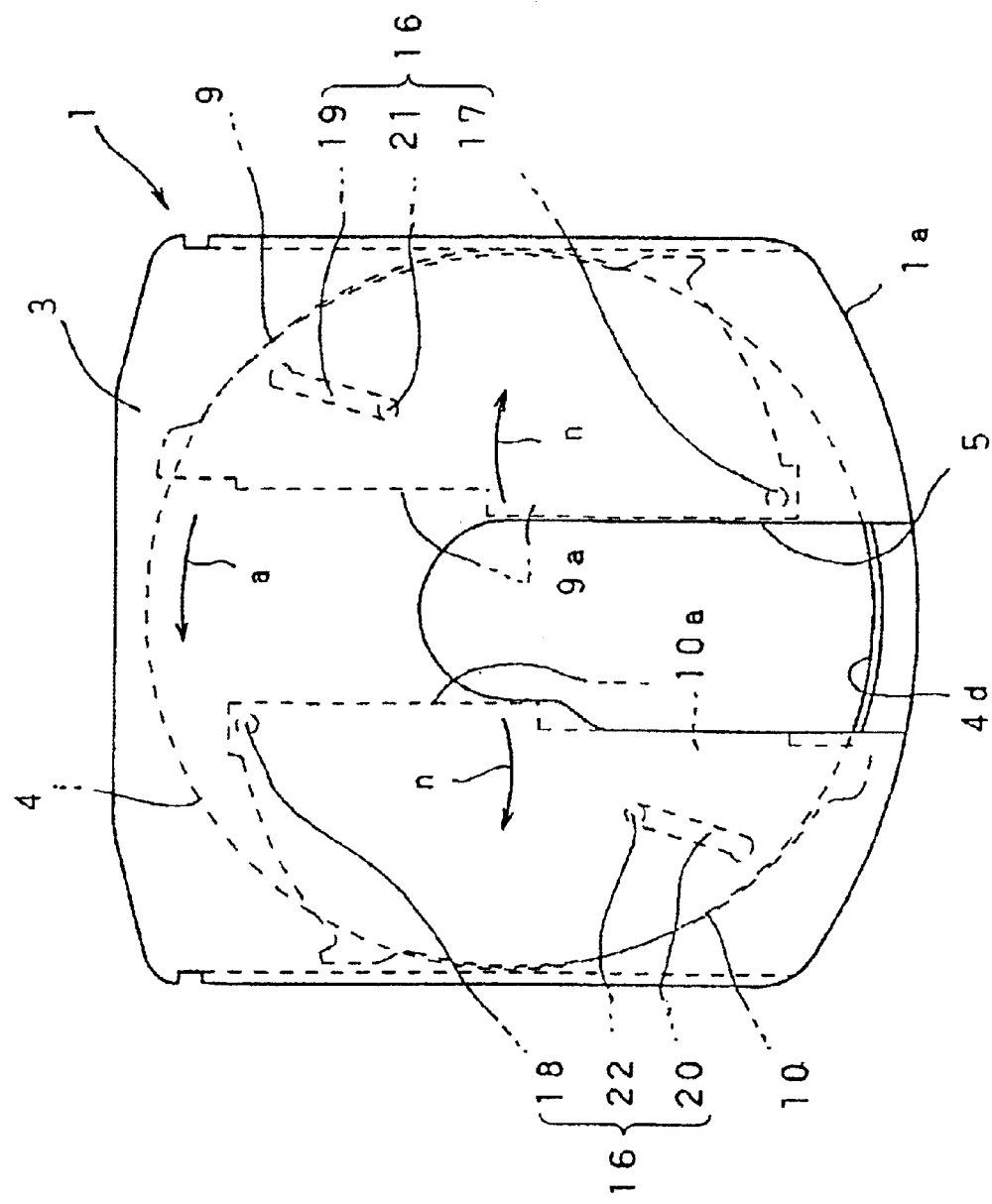
FIG. 27 is a bottom view showing a state that the shutters are opened, to open the pickup insertion hole of the disk cartridge.
Figure 28:
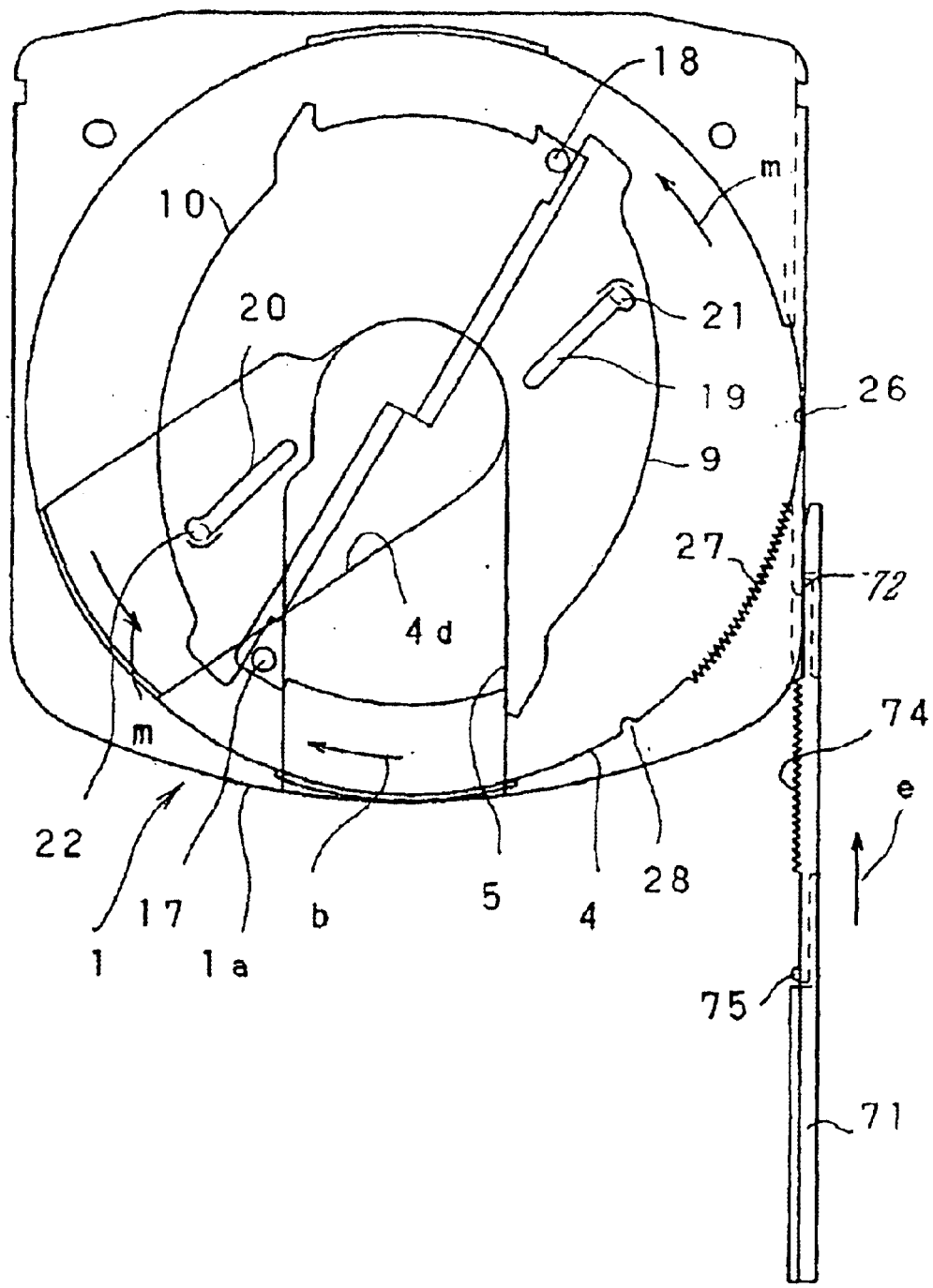
FIG. 28 is a perspective bottom view showing a shutter closing state, for illustrating an operation of rotating the inner rotor by the rack member, thereby opening/closing the shutters.
Figure 29:
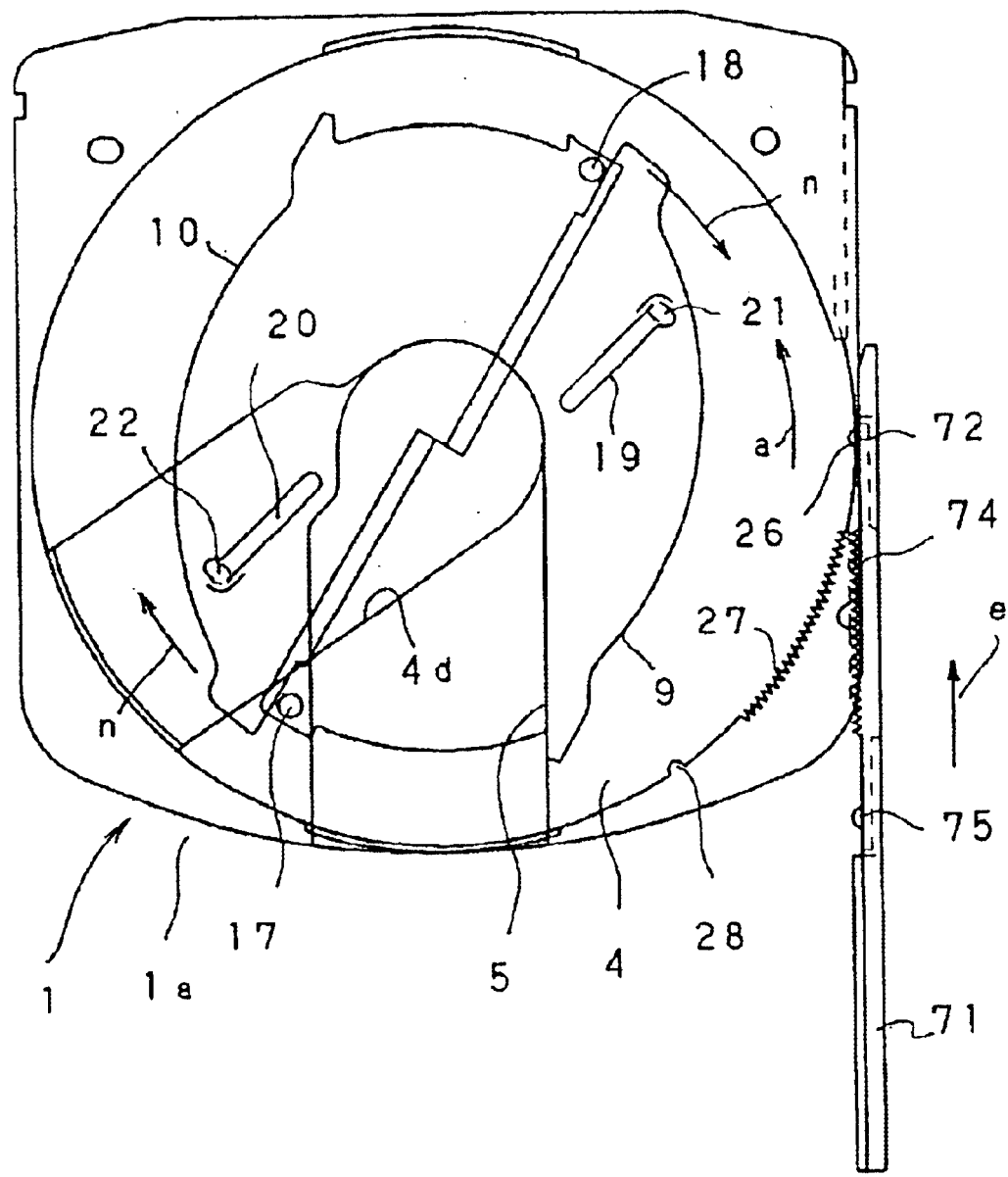
FIG. 29 is a perspective bottom view, continuous to FIG. 28, showing a shutter opening motion of the inner rotor by the rack member.
Figure 30:
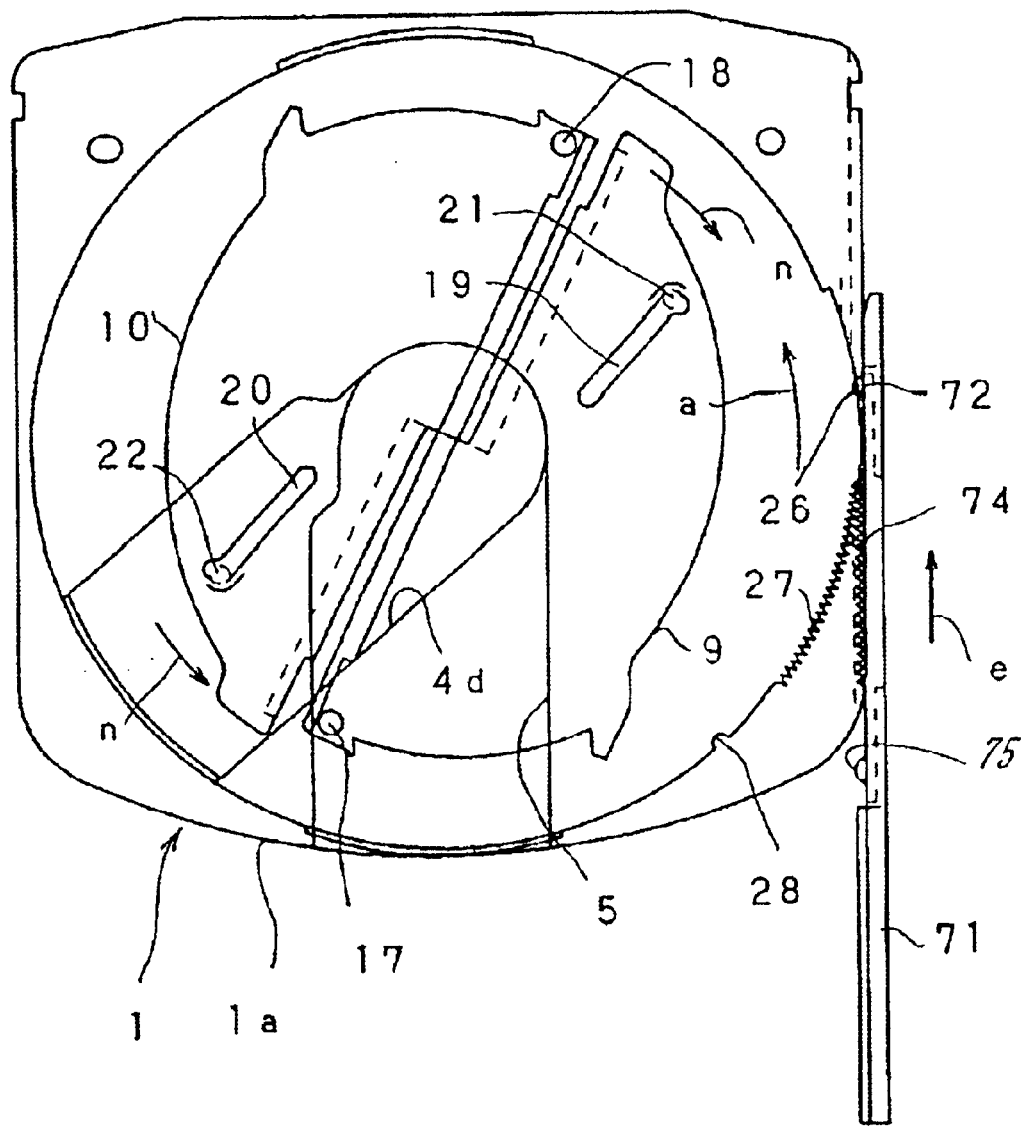
FIG. 30 is a perspective bottom view, continuous to FIG. 29, showing a shutter opening motion by the rack member.
Figure 31:
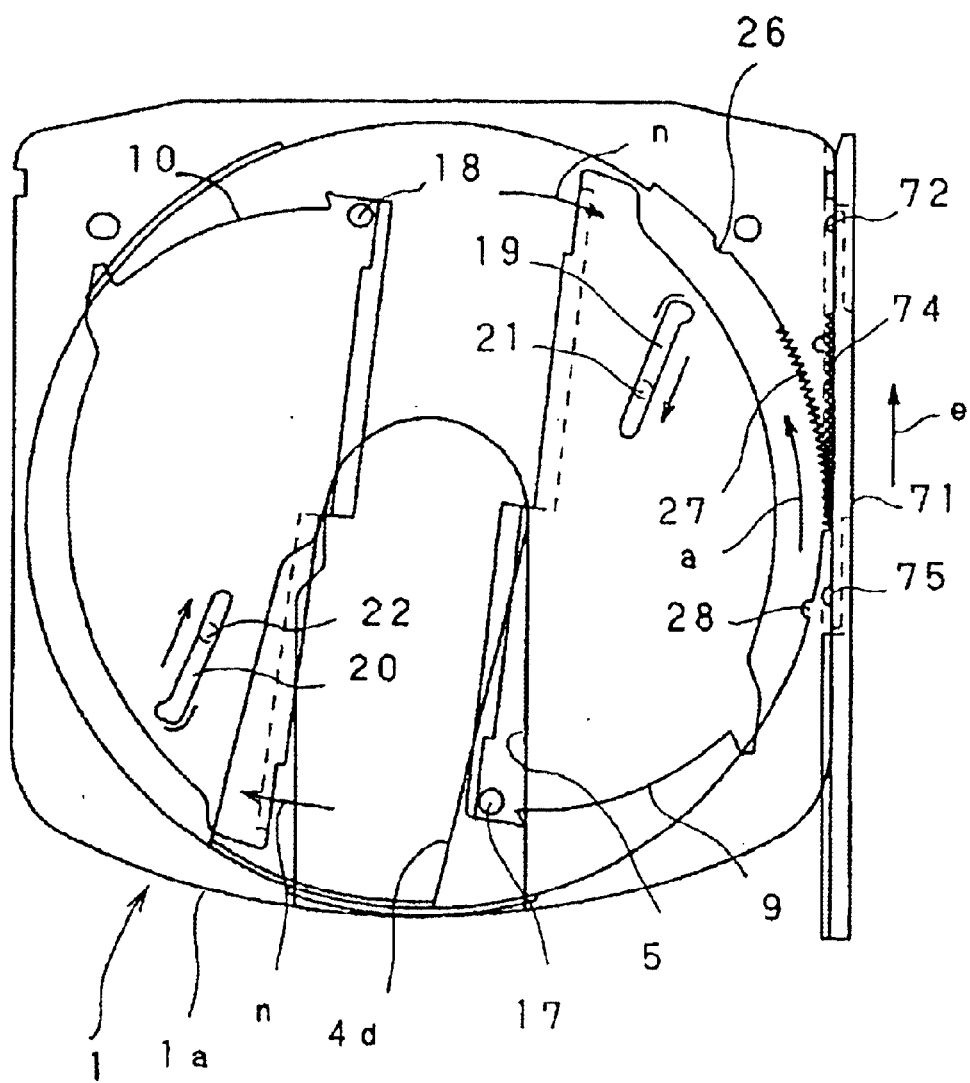
FIG. 31 is a perspective bottom view, continuous to FIG. 30, showing a shutter opening motion by the rack member.
Figure 32:
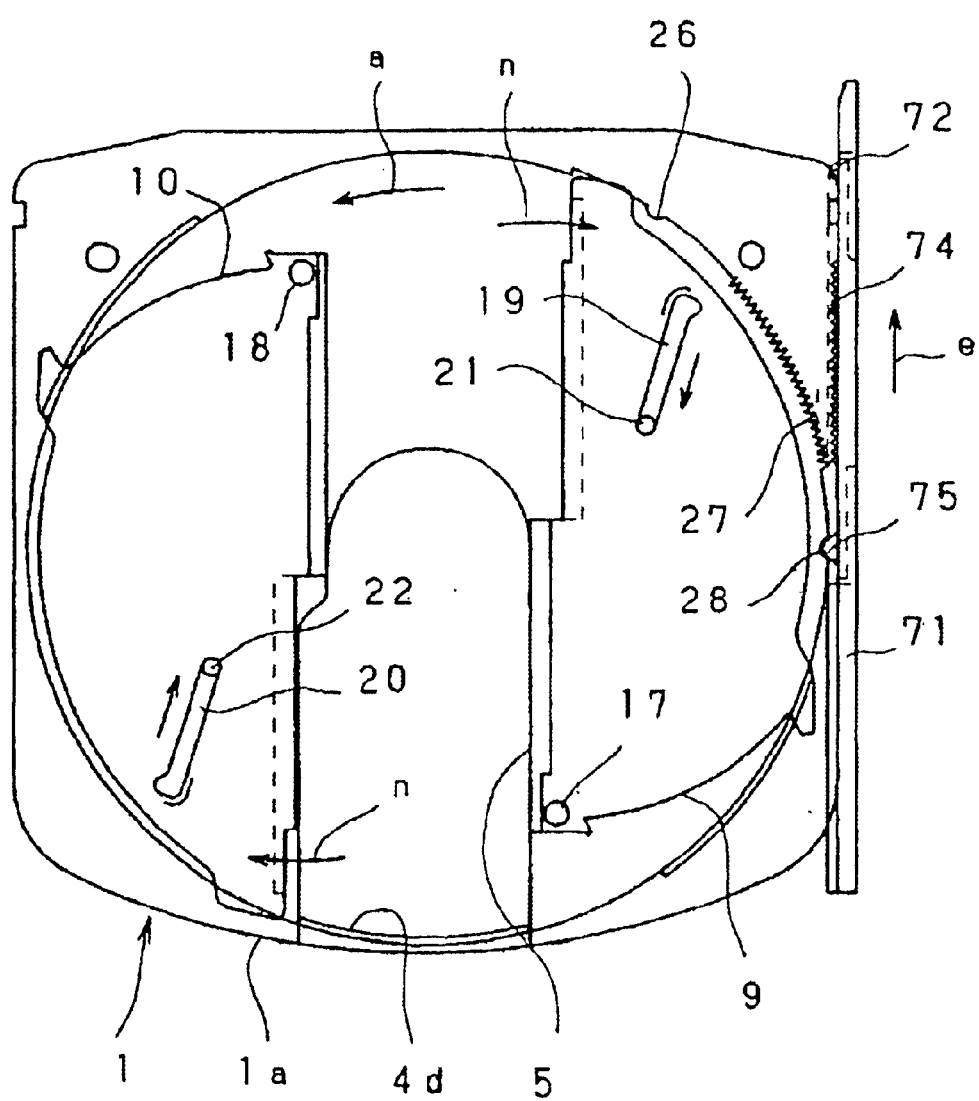
FIG. 32 is a perspective bottom view, continuous to FIG. 31, showing the final shutter opening motion by the rack member.
Figure 33:
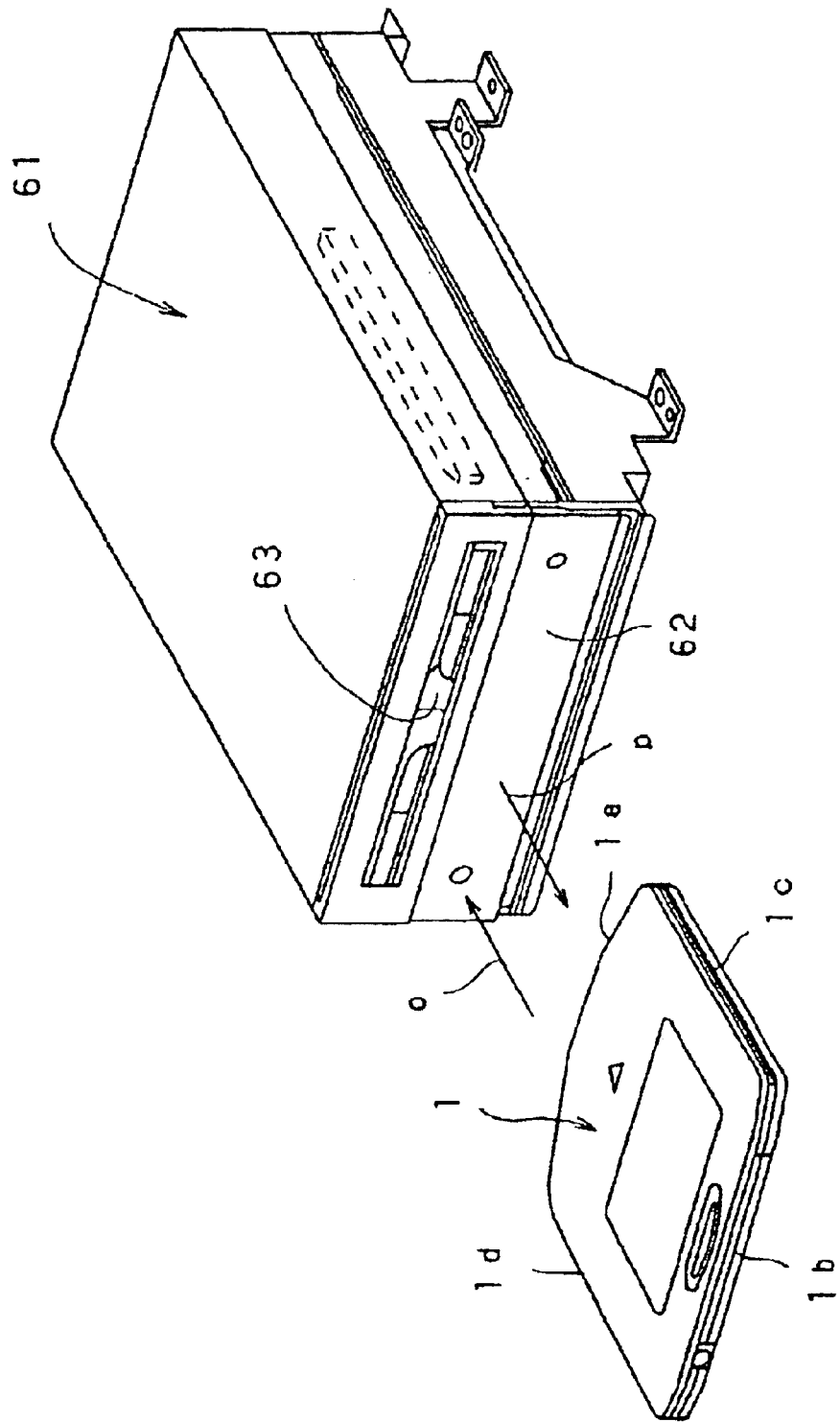
FIG. 33 is a perspective view of the disk cartridge and a disk drive unit.

On the other hand, as shown in FIGS. 27 and 32, when the inner rotor 4 is rotated in the direction "a" to the shutter opening/closing ending position (=shutter opening position) as described above, the shutter opening/closing mechanism 16 turns the pair of shutters 9 and 10 around the pair of turning fulcrum pins 17 and 18 in the direction "n" where the shutters 9 and 19 are separated apart from each other by the so-called cam action, which action is caused by the pair of cam grooves 19 and 20 and the cam pins 21 and 22 in synchronization with the turning motion of the pair of turning fulcrum pins 17 and 18 in the direction "a", to open the pair of shutters 9 and 10 in parallel to each other to both side positions of the pickup insertion hole 5.

At this time, the opening portion 4d of the inner rotor 4 is perfectly overlapped to the pickup insertion hole 5, whereby the entire region of the pickup insertion hole 5 is perfectly opened.

Figure 25:
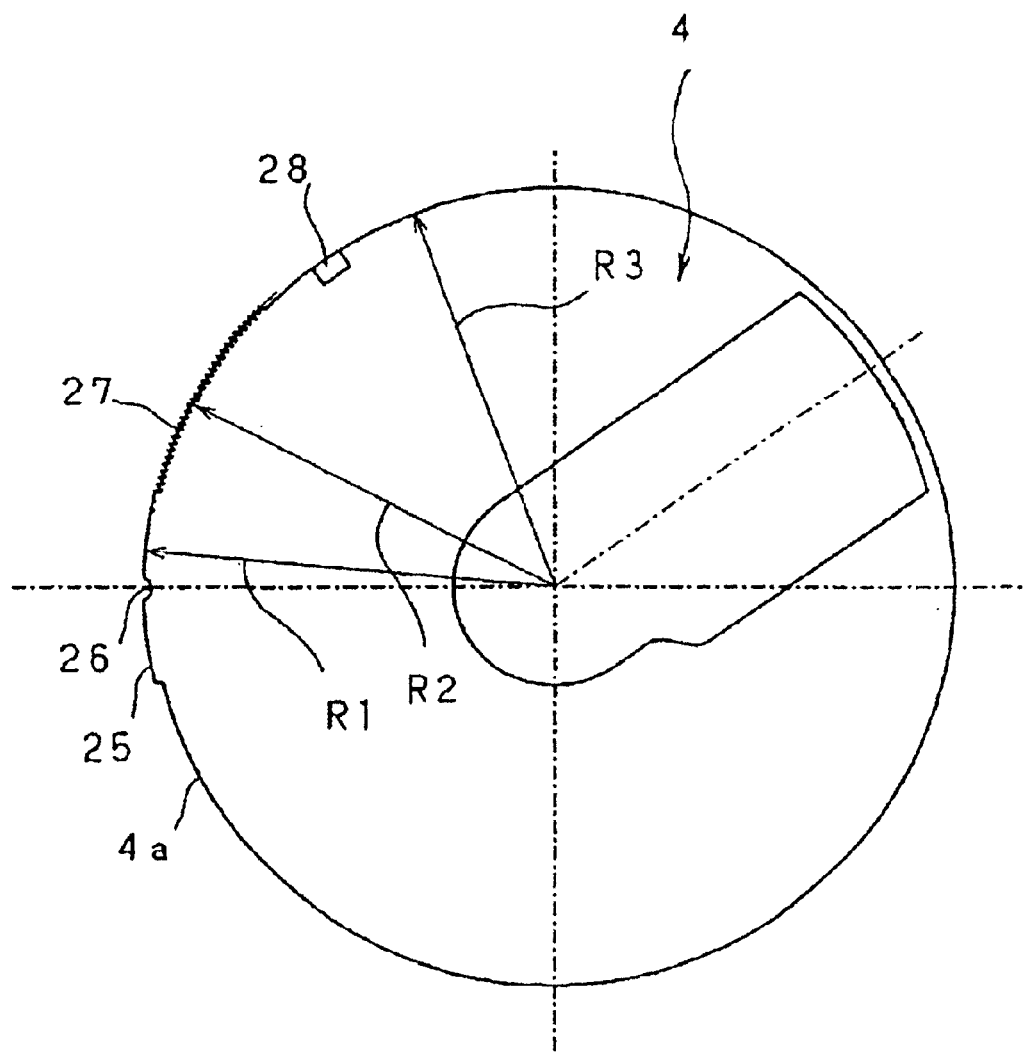
FIG. 25 is a bottom view of the inner rotor.

FIG. 25 shows the arrangement of the shutter opening/closing starting projection 25, the shutter opening/closing starting recess 26, the partial gear 27, and the shutter opening/closing recess 28 on and in the outer periphery of the inner rotor 4. As shown in this figure, the shutter opening/closing starting projection 25 is formed into a circular-arc shape along the maximum circular portion, having the maximum radius R1, of the inner rotor 4; the partial gear 27 is formed into a circular-arc shape along a circular portion of the inner rotor 4, which circular portion has an intermediate radius R2 and which is inscribed with the circular portion having the maximum radius R1; and the shutter opening/closing ending recess 28 is formed in the outer peripheral surface 4a as a circular portion, having the minimum radius R3, of the inner rotor 4.

FIGS. 28 to 32 show sequential motions of opening the pair of shutters 9 and 10. As shown in these figures, when the inner rotor 4 is rotated from the shutter opening/closing starting position (=shutter closing position) shown in FIG. 28 to the shutter opening/closing starting position (=shutter closing position) shown in FIG. 32 by sliding the rack member 71 relative to the disk cartridge 1 in the direction "e" along one side surface 1c (reference surfaces 33) of the disk cartridge 1 so as to sequentially engage and mesh the shutter opening/closing starting projection 72, the rack portion 74, and the shutter opening/closing ending projection 75 of the rack member 71 with the shutter opening/closing starting recess 26, the partial gear 27, and the shutter opening/closing ending recess 28 of the inner rotor 4 as described above, the pair of shutters 9 and 10 are opened from the shutter closing position shown in FIG. 28 to the shutter opening position shown in FIG. 32 by the cam action of the shutter opening/closing mechanism 16.

FIGS. 33 to 36 show the disk drive unit 61 for illustrating the steps of inserting the disk cartridge 1 in the direction "o" from a slit-shaped cartridge insertion port 63 formed on the upper side of a front panel 62 into the cartridge holder 64, and engaging a lock arm 67 as a locking means mounted in the cartridge holder 64 with the locking recess 13 formed in the other side surface 1d of the disk cartridge 1, thereby locking (holding) the disk cartridge 1 in the cartridge holder 64.

Since-then, the inner rotor 4 is rotated by sliding the rack member 71, for example, in accordance with each of the sliding methods (to be described later), to open the shutters 9 and 10 shown in FIG. 22 in the direction "m".

After the shutters 9 and 10 are opened, the cartridge holder 64 is moved down with its horizontal posture kept, or is withdrawn backwardly once with its horizontal posture kept and is then moved down with its horizontal posture kept, to be located at a suitable position. While not shown, a disk table connected to a spindle motor and an optical pickup are then relatively inserted, from below, in the pickup insertion hole 5 of the disk cartridge 1. The disk D is floated to an intermediate position in the vertical direction of the disk housing portion 6 of the inner rotor 4, and is centered and chucked on the disk table by the disk clamper 11.

The disk D is rotated at a specific speed by the spindle motor, and data are recorded on or reproduced from the disk D by the optical pickup and the like.

Figure 34:
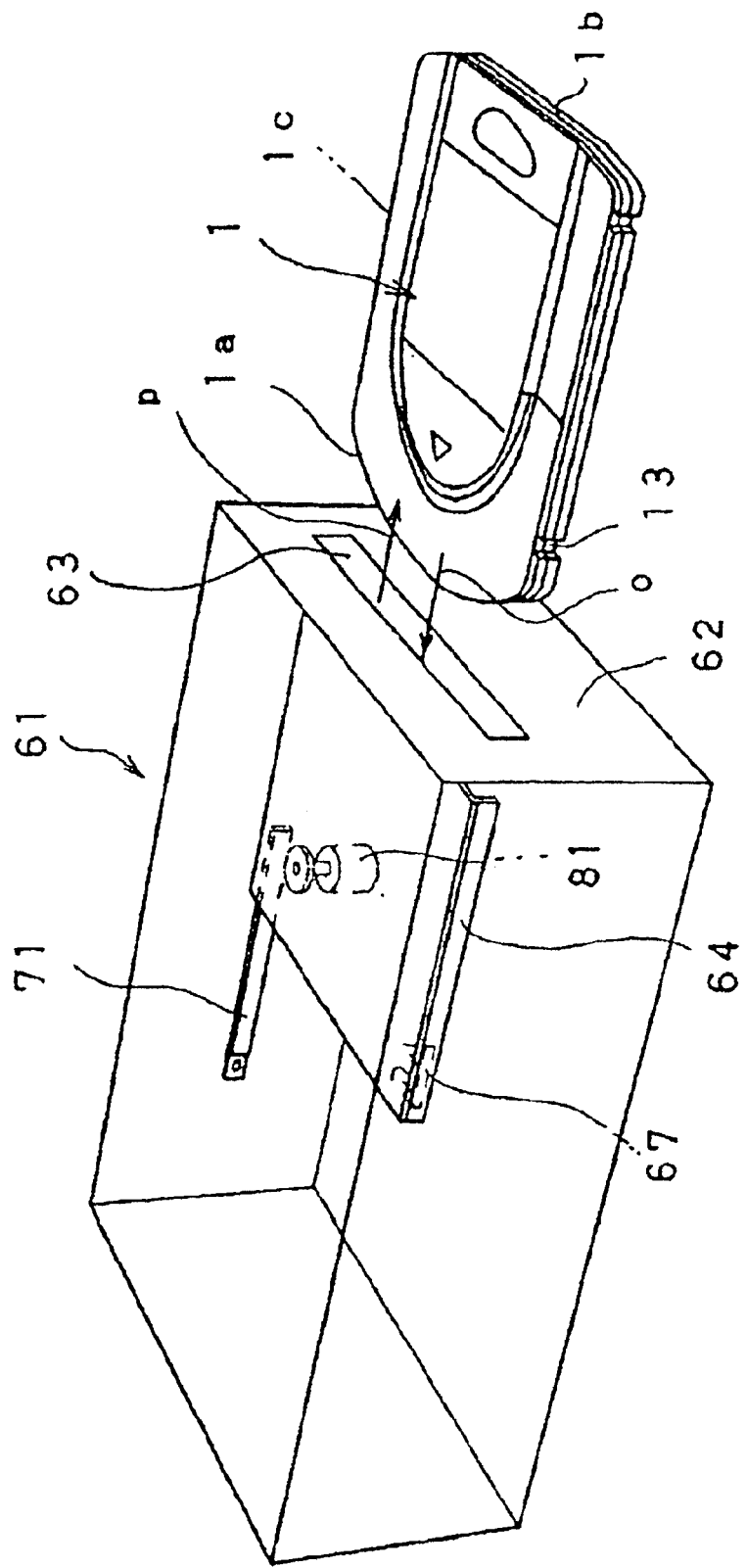
FIG. 34 is a perspective view showing an initial state in a first example of a method of sliding the rack member for opening/closing the shutters of the disk cartridge.
Figure 35:
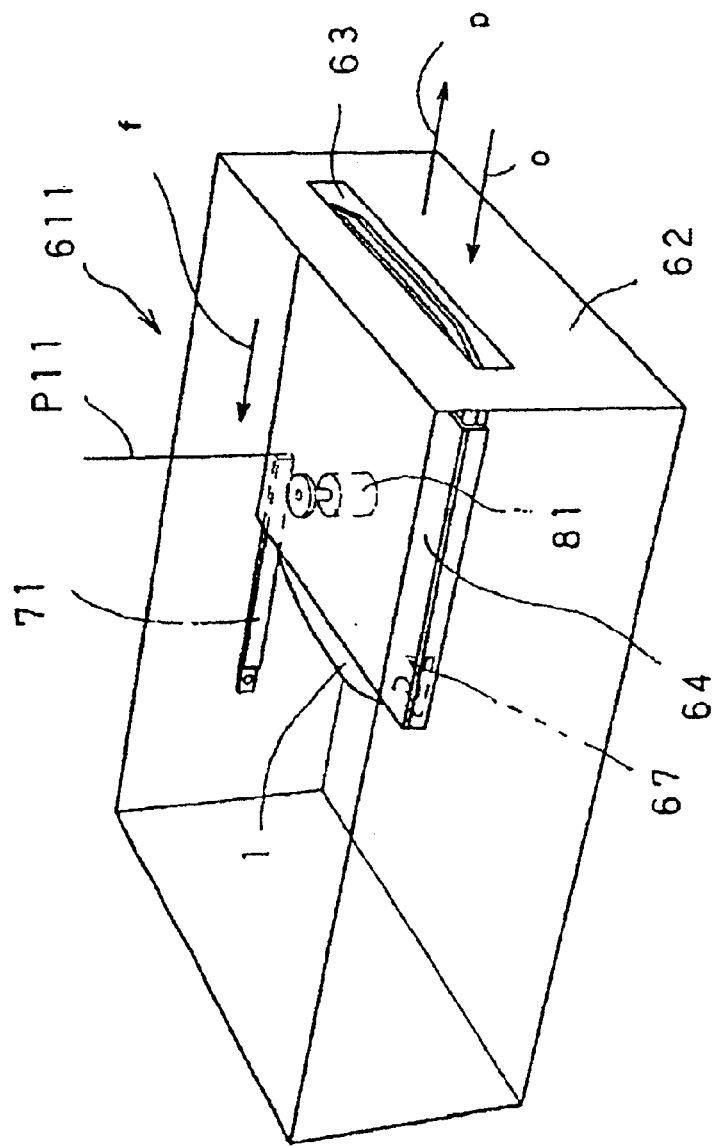
FIG. 35 is a perspective view, continuous to FIG. 34, showing a second example of the method of sliding the rack member.

(7) Description of First Example of Sliding Rack Member Relative to Disk Cartridge in Disk Drive Unit A first example of sliding the rack member 71 relative to the disk cartridge 1 will be described with reference to FIGS. 34 to 36. In this first example, as shown in FIGS. 34 and 35, the disk cartridge 1 is inserted along the direction "o" in a cartridge holder 64 provided in the disk drive unit 61 and is locked with a lock arm 67. When the insertion of the disk cartridge 1 in the cartridge holder 64 is detected by a cartridge insertion sensor (not shown), the rack member 71 is slid in the direction "e" from a shutter opening/closing starting point P11 shown in FIG. 35 to a shutter opening/closing ending position P12 shown in FIG. 36 while being guided between the above-described reference surfaces 33 of the disk cartridge 1 by a rack drive motor 81 as a rack drive means. As a result, the inner rotor 4 is rotated in the direction "a", to open the shutters.

Figure 36:
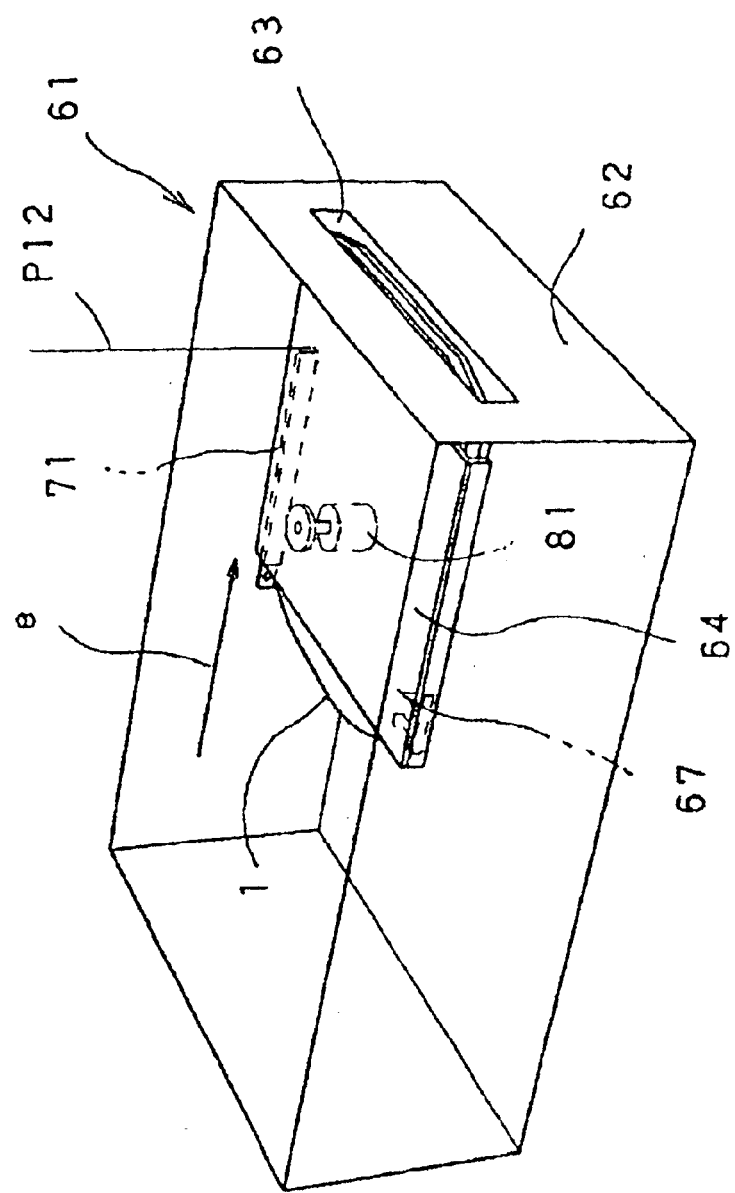
FIG. 36 is a perspective view, continuous to FIG. 35, showing the second example of the method of sliding the rack member.

After information is recorded on and/or reproduced from the disk D, the rack member 71 is slid in the direction "f" from the shutter opening/closing ending position P12 shown in FIG. 36 to the shutter opening/closing starting position P11 shown in FIG. 35 by the rack drive motor 81, whereby the inner rotor 4 is rotated in the direction "b" as described above, to close the shutters. Since then, as shown in FIG. 34, the disk cartridge 1 is ejected in the direction "p" from a cartridge insertion port 63 to the outside of the disk drive unit 61.

Accordingly, as described above, since the disk cartridge 1 can be ejected to the outside of the disk drive unit 1 in the state that the pickup insertion hole 5 of the disk cartridge 1 remains as closed with the shutters, it is possible to prevent permeation of duct in the disk cartridge 1.

According to this first example, since the inner rotor 4 can be rotated to open/close the shutters only by sliding the rack member 71 within a small space while the disk cartridge 1 remains as fixed (positioned) at a specific position in the cartridge holder 64, it is possible to facilitate miniaturization of the disk drive unit 61. Also, since the inner rotor 4 can be rotated only by driving the rack member 71, it is possible to simplify the driving mechanism and hence to reduce the production cost.

Figure 37:
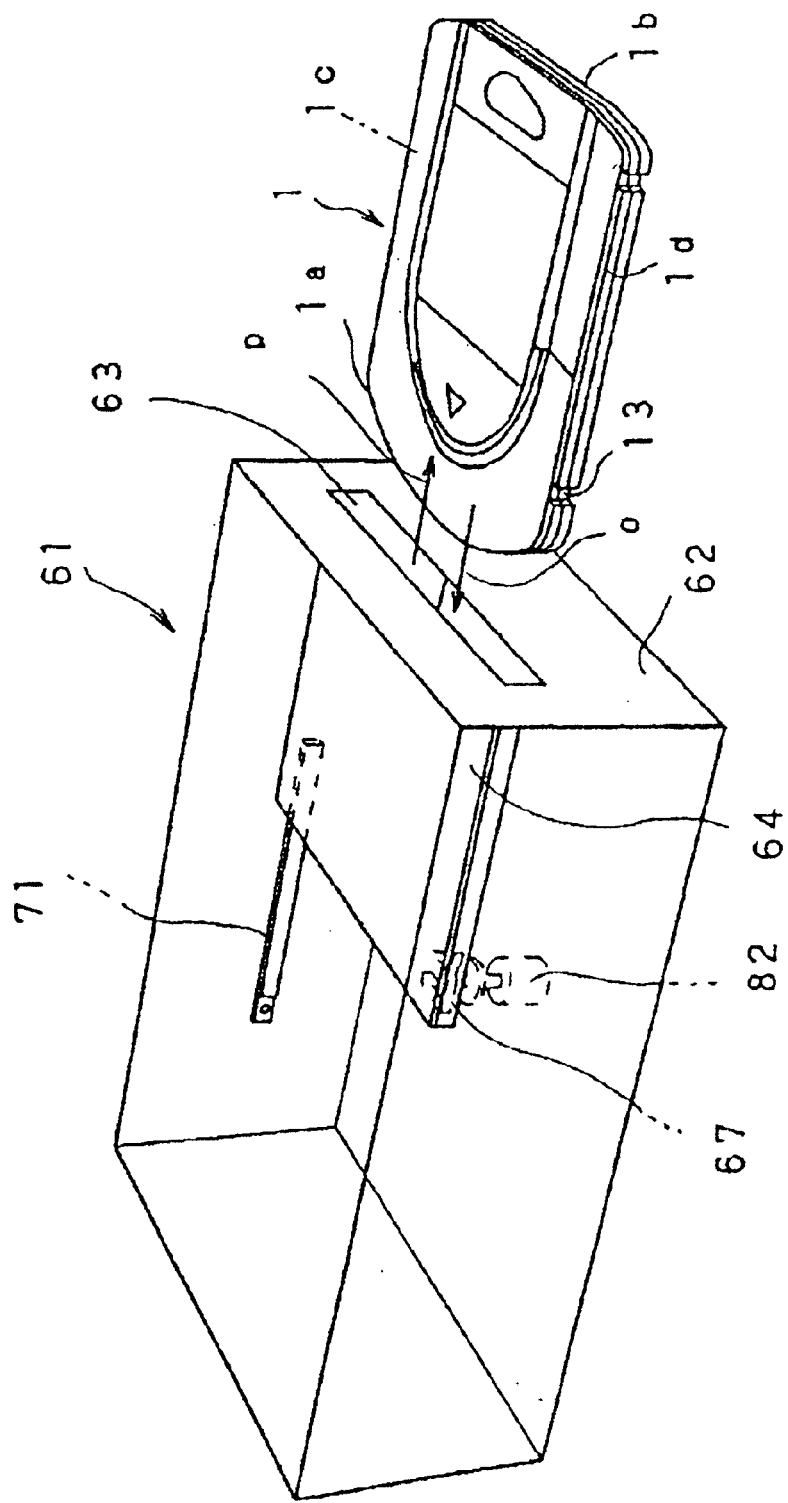
FIG. 37 is a perspective view showing an initial state in a second example of a method of sliding the rack member relative to the disk cartridge for opening/closing the shutters of the disk cartridge.
Figure 38:
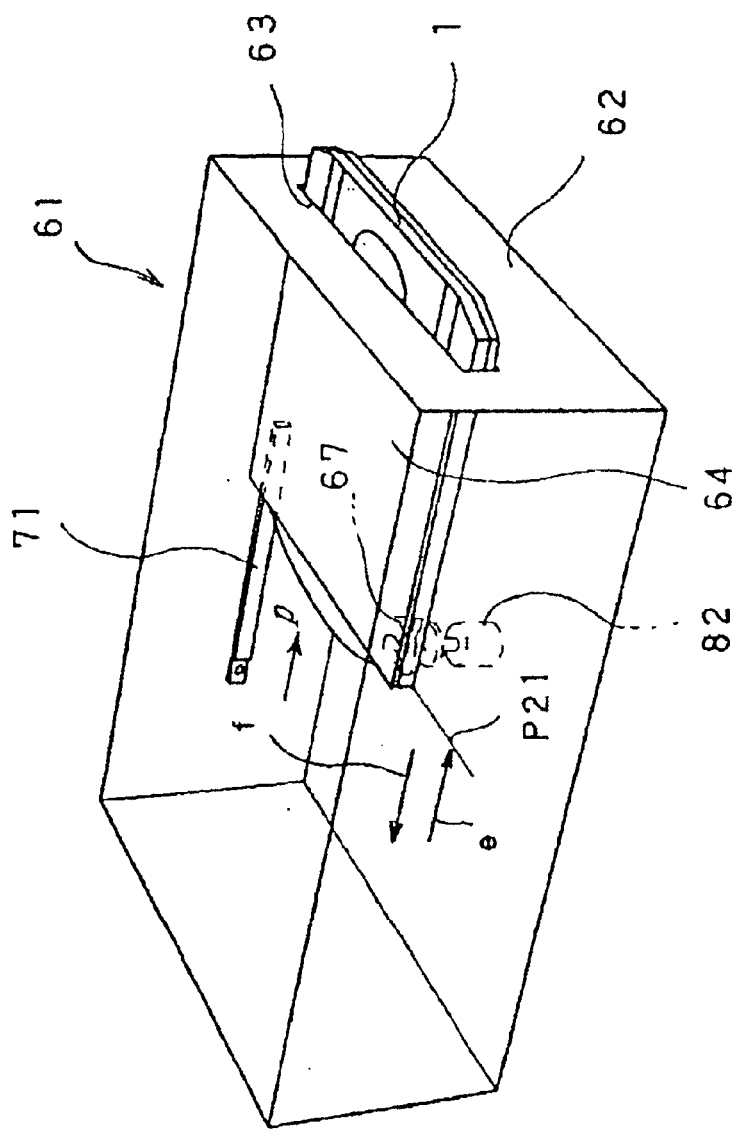
FIG. 38 is a perspective view, continuous to FIG. 37, showing the second example of the method of sliding the rack member relative to the disk cartridge.

(8) Description of Second Example of Sliding Rack Member Relative to Disk Cartridge in Disk Drive Unit A second example of sliding the rack member 71 relative to the disk cartridge 1 will be described with reference to FIGS. 37 to 40. In this second example, the rack member 71 is fixed to a specific position in the disk drive unit 61, and as shown in FIGS. 37 and 38, the disk cartridge 1 is inserted in the direction "o" in the cartridge holder 64 provided in the disk drive unit 61 and then the locking recess 13 is locked with the lock arm 67. When the insertion of the disk cartridge 1 in the cartridge holder 64 by the cartridge insertion sensor (not shown), the cartridge holder 64 is slid, together with the disk cartridge 1, in the direction "f" from a shutter opening/closing starting position P21 shown in FIG. 38 to a shutter opening/closing ending position P22 shown in FIG. 40 in such a manner as to be in parallel to the rack member 71 by a cartridge holder drive motor 82 as a cartridge holder drive means. Accordingly, as described above, the rack member 71 is slid relative to the disk cartridge 1 in the direction "e", whereby the inner rotor 4 is rotated in the direction "a", to open the shutters.

Figure 39:
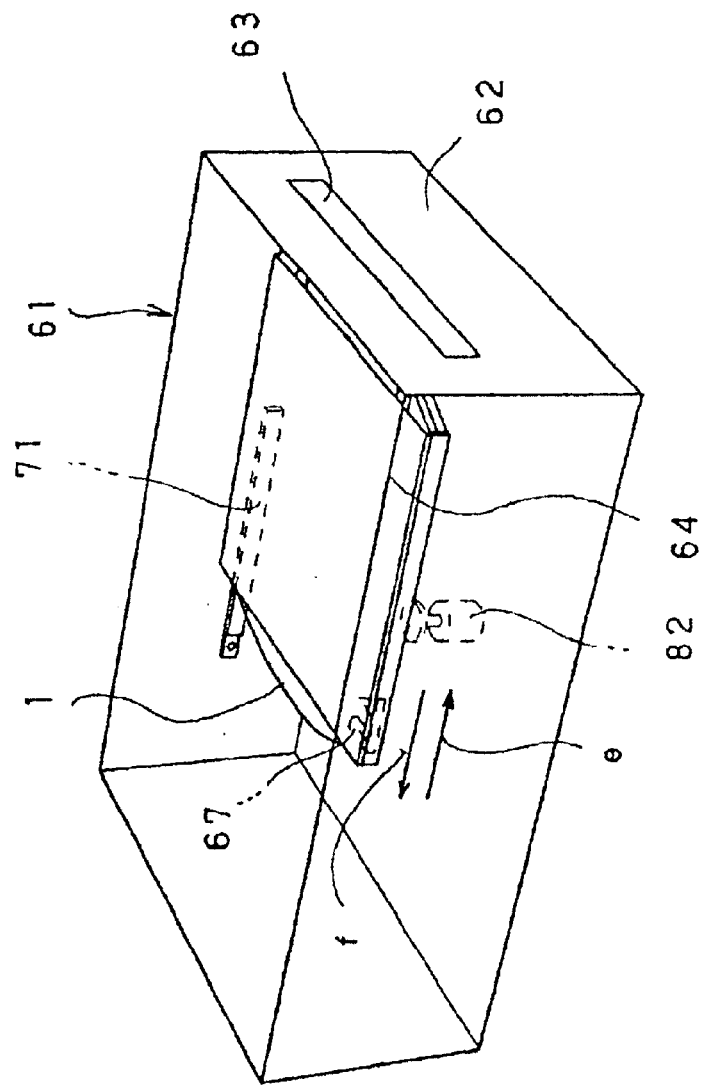
FIG. 39 is a perspective view, continuous to FIG. 38, showing the second example of the method of sliding the rack member relative to the disk cartridge.
Figure 40:
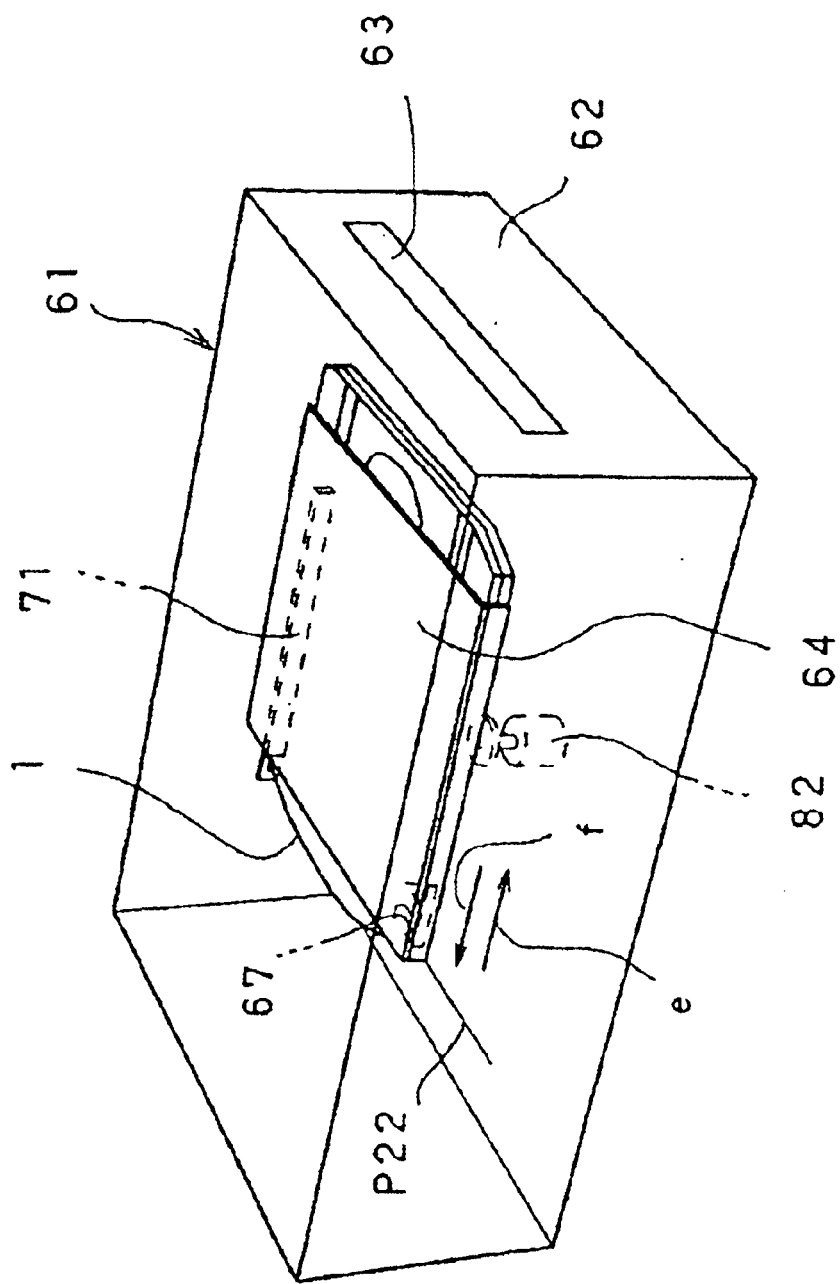
FIG. 40 is a perspective view, continuous to FIG. 39, showing the second example of the method of sliding the rack member relative to the disk cartridge.

After information is recorded on and/or reproduced from the disk D, the cartridge holder 64 is slid, together with the disk cartridge 1, in the direction "e" from the shutter opening/closing ending position P22 shown in FIG. 40 to the shutter opening/closing starting position P21 shown in FIG. 38 by the cartridge holder drive motor 82. As a result, the inner rotor 4 is rotated as described above, to close the shutters. Since then, as shown in FIGS. 38 and 39, the disk cartridge 1 is ejected in the direction "p" from the cartridge insertion port 63 to the outside of the disk drive unit 61.

Such a first example is suitable to a disk drive unit 61 of a type configured such that the cartridge holder 64 is moved in an L-shaped path along which the cartridge holder 64 is withdrawn horizontally in the direction "f" from a disk cartridge insertion position shown in FIG. 37 and is then moved down. This example is also advantageous in that since the inner rotor 4 can be rotated with the rack member 71 fixed at the specific position, it is possible to eliminate the need of provision of a mechanism for sliding the rack member 71, and hence to simplify the structure and reduce the production cost.

(9) Description of Third Example of Sliding Rack Member Relative to Disk Cartridge in Disk Drive Unit A third example of sliding the rack member 71 relative to the disk cartridge 1 will be described with reference to FIGS. 41 to 43. In this third example, the sliding motion of the rack member 71 shown in the first example is combined with the sliding motion of the cartridge holder 64 shown in the second example.

As shown in FIGS. 41 and 42, the disk cartridge 1 is inserted in the direction "o" in the cartridge holder 64 provided in the disk drive unit 61 and the locking recess 13 is locked with the lock arm 67. When the insertion of the disk cartridge 1 in the cartridge holder 64 is detected by the cartridge sensor (not shown), the rack member 71 is slid in the direction "e" from a shutter opening/closing starting position P11 shown in FIG. 42 to a shutter opening/closing ending position P12 shown in FIG. 43 by a rack drive motor 81. At the same time, the cartridge holder 64 is slid, together with the disk cartridge 1, in the direction "f" from a shutter opening/closing starting position P21 shown in 42 to a shutter opening/closing ending position P22 by a cartridge holder drive motor 82. Accordingly, the rack member 71 is slid relative to the disk cartridge 1 in the direction "e" by a specific stroke corresponding to the total of a sliding stroke of the rack member 71 in the direction "e" and a sliding stroke of the cartridge holder 64 in the direction "f". Accordingly, as described above, the inner rotor 4 is quickly rotated in the direction "a", to quickly open the shutters.

After information is recorded on and/or reproduced from the disk D, the rack member 71 is slid in the direction "f" from the shutter opening/closing ending position P12 shown in FIG. 43 to the shutter opening/closing starting position P11 shown in FIG. 42 by the rack drive motor 81, and at the same time, the cartridge holder 64 is slid in the direction "e" from the shutter opening/closing ending position P22 to the shutter opening/closing starting position P21 shown in FIG. 43, to close the shutters. Since then, as shown in FIGS. 42 and 41, the disk cartridge 1 is ejected in the direction "p" from the cartridge insertion port 63 to the outside of the disk drive unit 61.

According to this third example, the inner rotor 4 is rotated by the sliding stroke corresponding to the total of the sliding stroke of the rack member 71 relative to the disk cartridge 1 in the direction "e" and the sliding stroke of the rack member 71 relative to the disk cartridge 1 in the direction "f", to open/close the shutters. As a result, each of the sliding strokes of the rack member 71 and the disk cartridge 1 can be reduced to a half of that in each of the first and second examples, to miniaturize the whole structure, and also the sliding drive time required for drive of the rack member 71 or the disk cartridge 1 can be shortened to a half of that in each of the first and second examples, with a result that it is possible to shorten the loading time and unloading time of the disk cartridge 1 in the disk drive unit 61.

While the embodiments of the present invention have been described, the present invention is not limited thereto, and it is to be understood that various changes may be made within the technical scope of the present invention.

For example, the disk cartridge 1 according to the present invention may be configured such that the whole or part of the upper shell 2 is openable/closable with respect to the lower shell 3, to allow the disk D to be removably inserted in the disk housing portion 6. Such a configuration of the disk cartridge 1 can be applied to a disk cartridge of a type generally called "caddy".

The disk drive unit of the present invention having the above-described configuration exhibits the following effects:

According to the present invention, the disk cartridge in which the disk-like recording medium is housed is configured such that the pickup insertion port is open/closed, from inside, with the shutters by rotation of the inner rotor, to thereby prevent the shutters from being simply opened from outside. In this disk cartridge, the inner rotor is rotated by sliding the rack member relative to the disk cartridge, to open/close the shutters. At this time, the inner rotor can be continuously rotated from the shutter opening/closing starting position to the shutter opening/closing ending position by sequentially engaging the shutter opening/closing starting projection, the rack portion, and the shutter opening/closing ending projection of the rack member with the shutter opening/closing starting recess, the partial gear, and the shutter opening/closing ending recess in the outer periphery of the disk cartridge. To be more specific, at this time, the shutter opening/closing starting projection and the shutter opening/closing projection of the rack member can be reasonably, smoothly engaged with the shutter opening/closing starting recess and the shutter opening/closing ending recess, whereby the shutters can be reasonably, smoothly opened/closed by rotation of the inner rotor. As a result, the operation of opening/closing the shutters can be effectively performed irrespective of the type of inserting the disk cartridge in the disk drive unit by specifying the basic operation of opening/closing the shutters by rotation of the inner rotor.

According to the present invention, the shutter opening/closing starting projection and the shutter opening/closing ending projection are integrally molded on the rack member via the mold springs, or since the shutter opening/closing starting projection and the shutter opening/closing ending projection are formed separately from the rack member and are mounted to the rack member via the spring members for biasing the shutter opening/closing starting projection and the shutter opening/closing ending projection in the direction where the shutter opening/closing starting projection and the shutter opening/closing ending projection are engaged with the shutter opening/closing starting recess and the shutter opening/closing ending recess, it is possible to eliminate any operational failure caused by variations in dimension of the components, and hence to usually, positively perform the operation of opening/closing the shutters by rotation of the inner rotor.

What is claimed is:

1. A disk drive unit for recording and/or reproducing information on and/or from a disk-like recording medium rotatably housed in a disk cartridge including an inner rotor rotatably housed therein and a shutter for opening/closing, from inside, a pickup insertion port by rotation of said inner rotor, said disk drive unit comprising:

a rack member having a shutter opening/closing starting projection, a rack portion, and a shutter opening/closing ending projection, which are to be sequentially engaged with a shutter opening/closing starting recess, a partial gear, and a shutter opening/closing ending recess or projection formed in or on the outer periphery of said inner rotor; and driving means for rotating said inner rotor from a shutter opening/closing starting position to a shutter opening/closing ending position by sliding said rack member relative to said disk cartridge;

wherein said drive means moves at least one of said rack member and said disk cartridge in such a manner that said shutter opening/closing starting recess and said shutter opening/closing ending recess or projection of said inner rotor are engaged with and released from said shutter opening/closing starting projection and said shutter opening/closing ending projection of said rack member.

2. A disk drive unit according to claim 1, wherein said rack member is made from a plastic material, and said shutter opening/closing starting projection and said shutter opening/closing ending projection are integrally molded, together with a mold spring, on said rack member.

3. A disk drive unit according to claim 1, wherein said rack member has a first member on which said shutter opening/closing starting projection is provided, and a second member on which said shutter opening/closing ending projection is provided; and said first member and said second member are mounted to said rack member via a spring member for biasing said shutter opening/closing starting projection and said shutter opening/closing ending projection in a direction where said shutter opening/closing starting projection and said shutter opening/closing ending projection are engaged with said shutter opening/closing starting recess and said shutter opening/closing ending recess.

* * * * *